(12) United States Patent
Smith et al.

(10) Patent No.: US 8,020,199 B2
(45) Date of Patent: *Sep. 13, 2011

(54) SINGLE SIGN-ON SYSTEM, METHOD, AND ACCESS DEVICE

(75) Inventors: Steven W. Smith, Dallas, TX (US);
James B. Pritchard, Fairview, TX (US);
Sidney L. Weatherford, Richardson, TX (US)

(73) Assignee: 5th Fleet, L.L.C., Richardson, TX (US)

( * ) Notice: Subject to any disclaimer, the term of this patent is extended or adjusted under 35 U.S.C. 154(b) by 570 days.

This patent is subject to a terminal disclaimer.

(21) Appl. No.: 12/218,009

(22) Filed: Jul. 10, 2008

(65) Prior Publication Data

US 2008/0301791 A1    Dec. 4, 2008

Related U.S. Application Data

(63) Continuation-in-part of application No. 11/607,764, filed on Dec. 1, 2006, now Pat. No. 7,502,936, which is a continuation-in-part of application No. 11/061,223, filed on Feb. 18, 2005, now Pat. No. 7,581,113, which is a continuation-in-part of application No. 09/783,049, filed on Feb. 14, 2001, now Pat. No. 7,043,640.

(51) Int. Cl.
*G06F 7/04*      (2006.01)
*G06F 17/30*     (2006.01)
*H04L 29/06*     (2006.01)
*G06F 15/16*     (2006.01)

(52) U.S. Cl. .......................................... 726/7
(58) Field of Classification Search ........................ 726/7
See application file for complete search history.

(56) References Cited

U.S. PATENT DOCUMENTS

| | | | | |
|---|---|---|---|---|
| 5,668,876 A | * | 9/1997 | Falk et al. | 380/271 |
| 6,141,760 A | * | 10/2000 | Abadi et al. | 726/14 |
| 6,629,246 B1 | * | 9/2003 | Gadi | 726/8 |
| 2001/0037469 A1 | * | 11/2001 | Gupta et al. | 713/202 |
| 2002/0069357 A1 | * | 6/2002 | Kilkkila | 713/169 |
| 2003/0065956 A1 | * | 4/2003 | Belapurkar et al. | 713/202 |
| 2003/0101339 A1 | * | 5/2003 | Bianchini et al. | 713/153 |
| 2003/0163737 A1 | * | 8/2003 | Roskind | 713/201 |
| 2004/0064740 A1 | * | 4/2004 | Lin et al. | 713/201 |
| 2006/0059344 A1 | * | 3/2006 | Mononen | 713/171 |
| 2006/0143453 A1 | * | 6/2006 | Imamoto et al. | 713/169 |
| 2007/0150743 A1 | | 6/2007 | Weatherford et al. | |

(Continued)

OTHER PUBLICATIONS

Franks, J. et al. "HTTP Authentication: Basic and Digest Access Authentication" (RFC 2617), Jun. 1999.*

(Continued)

*Primary Examiner* — Michael Simitoski
(74) *Attorney, Agent, or Firm* — Steven W. Smith

(57) ABSTRACT

A system, method, and access device enabling a user to securely access a plurality of password-protected servers with a single entry of the user's User ID and associated password. When the access device receives the User ID and password from the user, it sends only the User ID to each of the password-protected servers. The servers each return a unique index value to the access device. The access device uses each index value to retrieve different password modification information from a database or lookup table. The access device then creates a plurality of modified passwords based at least in part on the password modification information. The access device then transmits each of the modified passwords to the corresponding password-protected server.

12 Claims, 19 Drawing Sheets

U.S. PATENT DOCUMENTS

2007/0169181 A1* 7/2007 Roskind .................... 726/5
2008/0028225 A1* 1/2008 Eckert et al. ................ 713/182
2008/0235775 A1* 9/2008 Lin et al. .................... 726/7
2008/0263362 A1* 10/2008 Chen .......................... 713/184
2009/0282243 A1* 11/2009 Rose et al. .................. 713/159

OTHER PUBLICATIONS

Halderman, J. Alex et al. "A Convenient Method for Securely Managing Passwords", May 2005.*

Kamendje, Guy-Armand et al. WIPO Publication WO 2005/125078, Dec. 2005.*

* cited by examiner

SINGLE SIGN-ON SYSTEM, METHOD, AND ACCESS DEVICE

RELATED APPLICATIONS

This application is a continuation-in-part of U.S. patent application Ser. No. 11/607,764 filed Dec. 1, 2006, now U.S. Pat. No. 7,503,936 which is a continuation-in-part of U.S. patent application Ser. No. 11/061,223 filed Feb. 18, 2005, now U.S. Pat. No. 7,581,113 which is a continuation-in-part of U.S. patent application Ser. No. 09/783,049 filed Feb. 14, 2001, now U.S. Pat. No. 7,043,640, the entire disclosures of which are incorporated by reference herein.

BACKGROUND OF THE INVENTION

The present invention is directed, in general, to computer security systems. More particularly, and not by way of limitation, the present invention is directed to a system, method, and access device for enabling a user to securely access a plurality of password-protected servers with a single entry of the user's User ID and associated password.

Computers and networks are often protected by passwords. In order to gain access to the computer or network, a user must enter a password. The computer or network controller (server) authenticates the password by comparing the password entered by the user with a stored password. If the entered password matches the stored password, the user is given access. If not, the user is denied access.

A major problem with password-protected computer systems is the already large and growing threat from "hackers." The popular definition of a hacker refers to individuals who gain unauthorized access to computer systems for the purpose of stealing and/or corrupting data. Hackers are known for breaking into supposedly secure computer systems and damaging web sites, credit card accounts, internal databases, and the like.

Hacker software tools include programs that try many combinations of numbers and letters over a set period of time in an attempt to compromise a password-protected system. On some computer operating systems, as each letter or number is presented by the hacker, the letter or number is confirmed by the system as being correct or incorrect. This serial confirmation sequence actually makes it easier for a hacker to gain entry because fewer combinations of letters and numbers have to be tried. On other operating systems, the password must be completely entered correctly before confirmation is supplied by the system. This may slow down the password discovery process, but with time, the hacker can eventually present a correct password to the target computer system.

A passive hacker may monitor communications between a client device and an authentication server to learn the user's password. The passive hacker may then use the learned password to gain access to the server at a later time. For this reason, many organizations have their users periodically change their passwords. This is a great inconvenience for the users. To defeat the passive hacker, solutions have been tried which change the password for each access. Each time the user logs on, the user types his personal password plus a six-digit number which changes for every logon attempt. Once again, this is a great inconvenience for the user.

An active hacker may actually intercept and alter data packets sent from the client device to the authentication server, preventing the original packets from arriving at the server. The active hacker may then alter the data contents of the packets or may alter address information, thereby posing as the authorized user. The above solution of adding a changing six-digit number to the user's personal password does not defeat this type of active hacker if the hacker can access the server while the changing number is still valid.

In another type of active hacking, the hacker intercepts and alters the destination address of the client's data packets to a fake website which simulates the website the user was trying to reach. For example, the hacker may reroute a user to a fake website which is set up to appear as the user's bank. In an alternative form of this technique, known as phishing, the hacker sends an e-mail to the user posing as his bank's security department and asks the user to click on a link to verify his account information. The link takes the user to a fake site where the user is asked to enter his password and his account number. The hacker then uses this information to access the user's account at his bank.

In yet another type of hacking, the hacker may install a program known as a Trojan on the user's computer. The Trojan may search for data files on the user's computer and transmit them over a network connection to the hacker. Alternatively, a program known as a "key-logging program" may monitor the user's keyboard and capture the keystrokes as the user enters his User ID and password. The Trojan then reports the User ID and password to the hacker who uses it to gain access to the user's protected information.

In the context of these threats from hackers, it is often desirable for a user to simultaneously log onto multiple password-protected servers. For example, management or accounting personnel in a corporation may need to access multiple secure corporate databases in order to do their jobs. These databases may be accessed through different password-protected servers, which may be in different domains within the corporate IT structure, and may be implemented utilizing different communication protocols. Currently, users must log into each of the password-protected servers individually, using different login credentials for each server.

Currently, there is no known solution for countering all of the above hacker threats, and there is no known solution for enabling a user to securely access a plurality of password-protected servers with a single entry of the user's User ID and associated password.

SUMMARY OF THE INVENTION

A need exists in the art for an improved system and method for providing secure access to a computer system, which overcomes the shortcomings of the prior art and protects computer systems from unauthorized access by both passive and active hackers. Such a system and method should also enable a user to securely access a plurality of password-protected servers with a single entry of the user's User ID and associated password. The present invention provides such a system and method.

In one embodiment, the present invention is directed to a computer-implemented method of securely sending a password from an authorized access device to an authentication device. The method includes the steps of sending an identifier from the access device to the authentication device; receiving from the authentication device, a response containing information regarding modifications to be made to a password associated with the identifier; modifying the password based at least in part on the information received from the authentication device; and transmitting the modified password from the access device to the authentication device.

In another embodiment, the present invention is directed to a computerized access device for securely sending a multi-character password to an authentication device. The access device includes means for receiving a User ID and an associated password from a user; means for sending only the User ID from the access device to the authentication device; means for receiving from the authentication device, an index value associated with the User ID; and a database for storing a plurality of password modification factors. The access device also includes means for extracting from the database, at least one password modification factor stored at a database location corresponding to the index value; means for modifying the password received from the user utilizing the at least one password modification factor extracted from the database; and means for transmitting the modified password from the access device to the authentication device.

In another embodiment, the present invention is directed to a computer-implemented method enabling a user to securely access a plurality of password-protected servers with a single entry of the user's User ID and associated password. The method includes the steps of receiving in an access device, the User ID and the associated password from the user; sending only the User ID from the access device to each of the password-protected servers; receiving from each of the password-protected servers, a response containing information regarding modifications to be made to the password; creating a plurality of modified passwords based at least in part on the information received from each of the password-protected servers, wherein each modified password corresponds to one of the password-protected servers; and transmitting each of the plurality of modified passwords from the access device to the corresponding password-protected server.

In another embodiment, the present invention is directed to a computerized access device for enabling a user to securely access a plurality of password-protected servers with a single entry of the user's User ID and associated password. The access device includes means for receiving the User ID and the associated password from the user; means for sending only the User ID from the access device to each of the password-protected servers; means for receiving from each of the password-protected servers, a response containing information regarding modifications to be made to the password; means for creating a plurality of modified passwords based at least in part on the information received from each of the password-protected servers, wherein each modified password corresponds to one of the password-protected servers; and means for transmitting each of the plurality of modified passwords from the access device to the corresponding password-protected server.

In another embodiment, the present invention is directed to a system for enabling a user to securely access a plurality of password-protected servers with a single entry of the user's User ID and associated password. The system includes an access device and a plurality of server applications associated with the plurality of password-protected servers. The access device includes means for receiving the User ID and the associated password from the user; means for sending only the User ID from the access device to each of the password-protected servers; means for receiving from each of the password-protected servers, a response containing information regarding modifications to be made to the password; means for creating a plurality of modified passwords based at least in part on the information received from each of the password-protected servers, wherein each modified password corresponds to one of the password-protected servers; and means for transmitting each of the plurality of modified passwords from the access device to the corresponding password-protected server. Each server application comprises means for recognizing the User ID and determining the information regarding modifications to be made to the password, wherein the information is unique to each server application and each User ID; means for sending the information to the access device; and means for authenticating a modified password received from the access device, wherein the password is modified with the information sent to the access device by each server application.

In yet another aspect, the present invention is directed to a computer program loaded on an internal memory of an access device. The program includes a plurality of code portions which, when run on a processor of the access device, cause the access device to securely access a plurality of password-protected servers with a single entry of a user's User ID and associated password by performing the steps of receiving in the access device, the User ID and the associated password from the user; sending only the User ID from the access device to each of the password-protected servers; receiving from each of the password-protected servers, a response containing information regarding modifications to be made to the password; creating a plurality of modified passwords based at least in part on the information received from each of the password-protected servers, wherein each modified password corresponds to one of the password-protected servers; and transmitting each of the plurality of modified passwords from the access device to the corresponding password-protected server.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF EMBODIMENTS

The present invention is an improved system and method for generating and authenticating a password to protect a computer system from unauthorized access. In the description herein, the computer system is described as a financial authorization network for exemplary purposes only. It should be understood that the invention is applicable to all types of password-protected computer systems.

Figure 1:
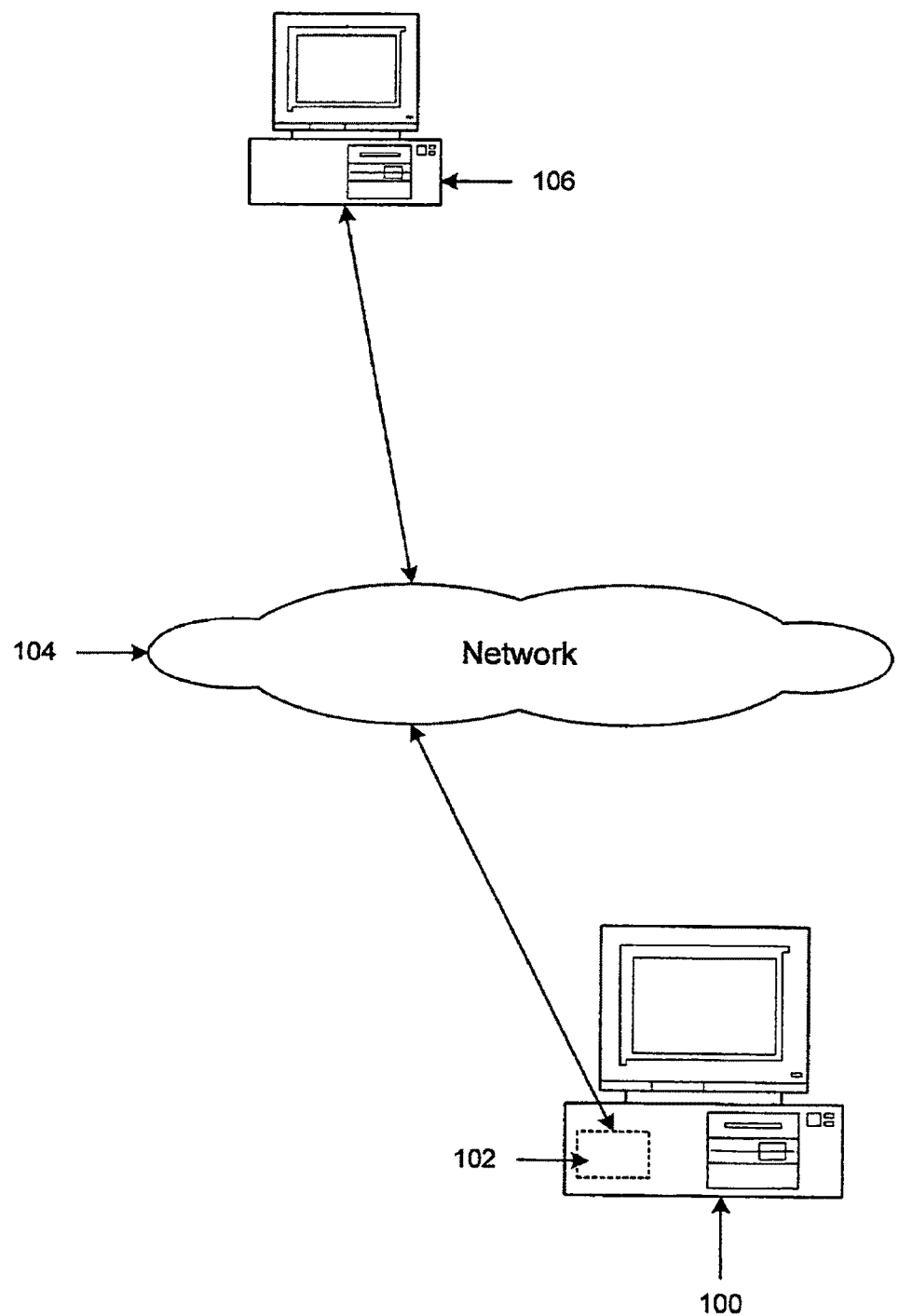
FIG. 1 is a high-level block diagram of an exemplary computer network system.

FIG. 1 depicts a high-level block diagram of an exemplary computer network system. Computer 100 contains a password protection system of the present invention. The present invention comprises executable computer program instructions in a computer program that may be installed in computer 100 to monitor incoming signals and data from computer network 104. A detection portion of the executable program instructions monitors and compares incoming signals with a stored series of predetermined signals. The detection portion of the executable program instructions may comprise a "terminate and stay resident" (TSR) program. The predetermined signals may represent letters, numbers, sounds, or any signals that are readable by a computer. A password builder portion of the executable computer program generates one or more "entry events." Each entry event is made up of one or more "entry signals." Two entry events may be separated by a predetermined time interval. A series of entry events separated by predetermined time intervals comprise a password of the present invention. The password is stored in a memory accessible by computer 100.

Communication between computer 100 and network 104 is accomplished utilizing network interface device (NID) 102. NID 102 can be a LAN connection, a WAN connection, cable modem, digital subscriber line (DSL) modem, wireline modem or any other means of connecting computer 100 with a network. Network 104 can be a LAN, a WAN, the Internet or any other network that is capable of sending/transmitting data between computers, telephones or any other electronic devices (smart houses, appliances, etc.) capable of transmitting and receiving data.

Computer 106 is connected to network 104 and may communicate with computer 100. Computer 106 may attempt to access data, files or programs that are resident on computer 100. Because computer 100 is protected by a password of the present invention, computer 106 must present a password attempt that is recognized by the TSR portion of the computer program that monitors NID 102 in order to gain access to computer 100. If a password attempt is presented by computer 106 and the TSR portion of the computer program residing in computer 100 rejects the password attempt, computer 106 is unable to communicate with or access computer 100. Only when computer 106 presents a password attempt that matches the stored password is access to computer 100 granted.

Figure 1A:
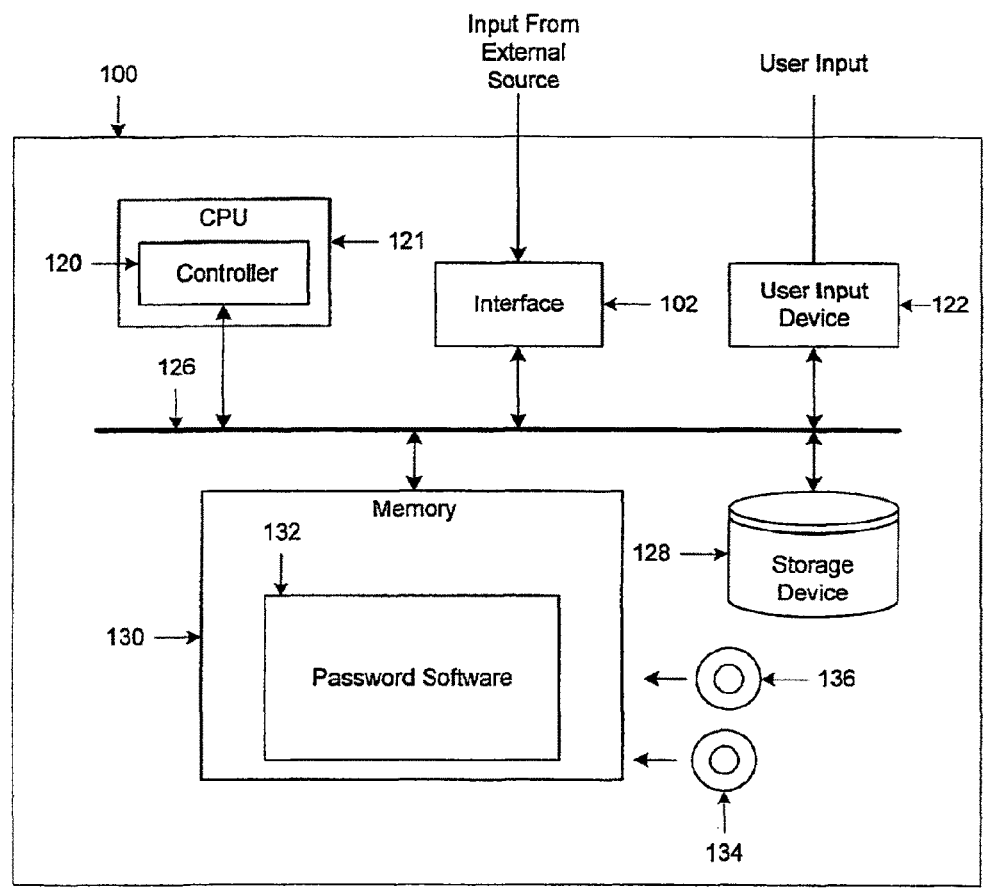
FIG. 1A is a high-level block diagram of an exemplary computer system in which an advantageous embodiment of the present invention is implemented.

FIG. 1A illustrates a high-level block diagram of computer 100. Computer 100 generally comprises central processing unit (CPU) 121, memory 130, storage device 128, external interface 102, and user input device 122. These elements of computer 100 are connected by and communicate through computer bus 126.

Computer 100 comprises memory 130 that contains password software 132 of the present invention. Controller 120 is depicted in this particular embodiment as contained within CPU 121. Controller 120 and password software 132 together comprise a password controller that is capable of carrying out the present invention. An operating system program (not shown) coordinates the operation of password software 132 with the operating system of controller 120.

Password software 132, under control of controller 120, identifies password attempts and individual password segments as they are received via interface 102. Interface 102 may comprise a network device, a modem, or any external connection device. A password attempt may also be received via user input device 122. User input device 122 may comprise a keyboard, a mouse, a floppy disk, etc. Password software 132 can detect a password attempt received by computer 100 from devices that provide local input and from network or modem type devices that provide remote input. A password attempt may be detected by receiving an entry event that signals a password attempt is to follow.

Controller 120 is capable of receiving user instructions from user input device 122. In response to user instructions, controller 120 is capable of instructing password software 132 to create elements of a new password and to modify elements of a previously stored password, where the password elements may comprise characters, symbols, numbers and time intervals. Controller 120 operates a portion of password software 132 to detect a password attempt from an external source. An external source includes, without limitation, a network connection, a modem connection, and any input device connected to computer 100 such as a keyboard, a mouse, a hard disk drive, etc. Controller 120 also operates password software 132 for comparing password attempts with a stored password (not shown in FIG. 1A).

Password software 132 is stored in memory 130 which may comprise random access memory (RAM) or a combination of random access memory (RAM) and read only memory (ROM). Memory 130 may comprise a non-volatile random access memory (RAM), such as flash memory. In an alternate advantageous embodiment of the present invention, password software 132 may be stored on a mass storage device, such as hard disk 128. In another alternate advantageous embodiment of the present invention, password software 132 may be stored on an attached peripheral drive or a removable disk drive (whether embedded or attached) of the type that reads a Read/Write DVD or a re-writable CD-ROM. These types of disk drives are illustrated schematically in FIG. 1A by Read/Write DVD 134 and re-writable CD-ROM 136.

Figure 2A:
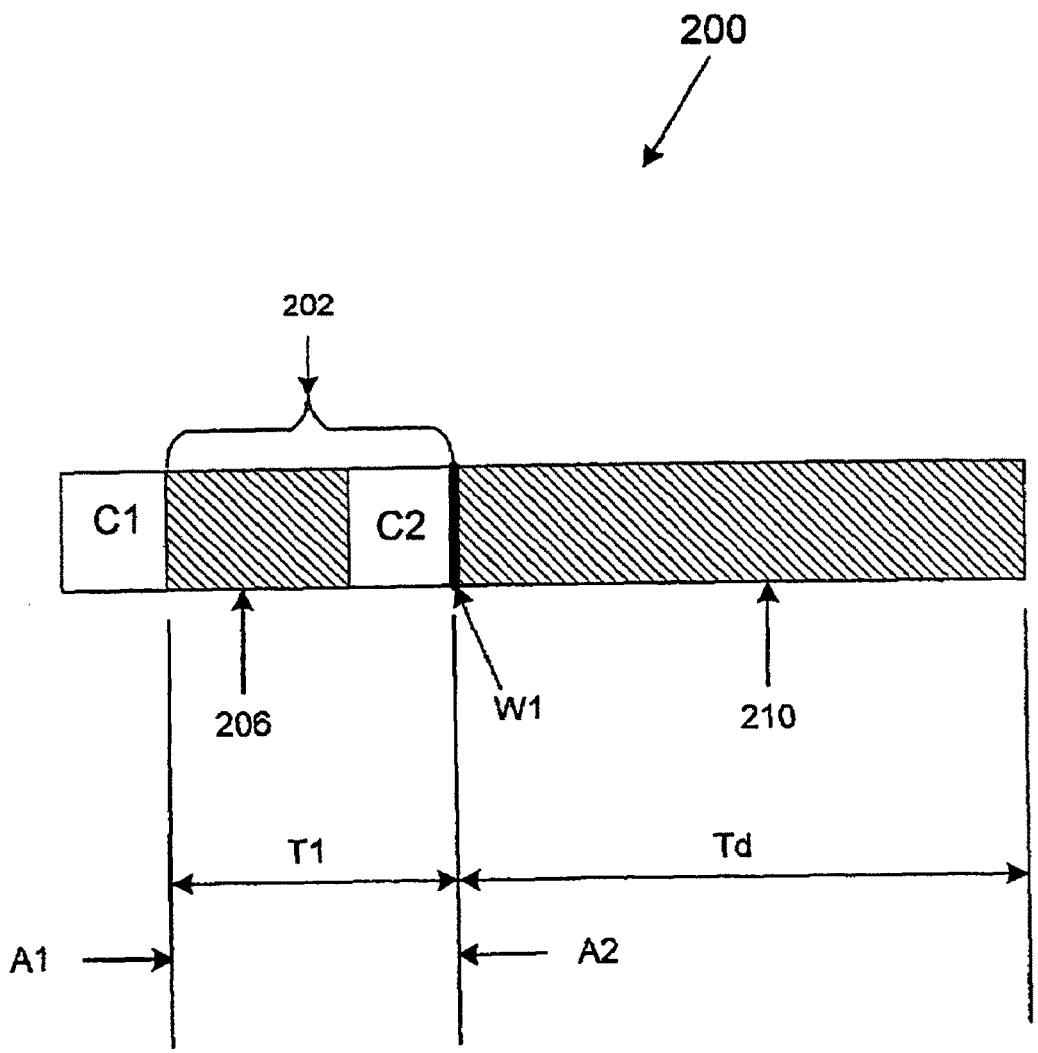
FIGS. 2A-E illustrate exemplary embodiments of the present invention in accordance with the principles of the present invention.

FIGS. 2A-2E illustrate exemplary embodiments of the password of the present invention. FIG. 2A depicts a high-level time-line for password 200 containing password segment 202 that comprises time interval 206 and entry event C2. A password comparison sequence is initiated when the TSR portion of the computer program recognizes an initial entry event/signal C1. The TSR portion of the computer program begins comparison of the incoming signals with the signals of the stored password. Entry event C1 acts as a start/sync character for the password detection algorithm. An entry event and an entry signal may be the same. However, there may be a plurality of entry signals that are required to produce a character (or characters) or a symbol (or symbols), etc., that make up a single entry event.

Initial entry event C1 serves to trigger an interval timer (not shown), controlled by password software 132, by causing the interval timer to set (or reset) to zero at time A1. In this embodiment, the timer is set upon detection of the trailing edge of entry event C1. After being set to zero, the interval timer starts calculating time intervals (in increments that may range from nanoseconds to days) for the incoming password attempt for comparison with the time intervals that are predetermined and incorporated into the stored password.

After initial entry event C1 is recognized by password software 132, a predetermined time interval 206 must occur. Time interval 206 is a period during which there are no entry events or entry signals. Should a character or entry signal be detected during time interval 206, password software 132 recognizes the "out of place" entry event as an invalid password attempt. In response to an invalid password attempt, time delay 210 is added to the actual time required to read the presented password and then returned as "access denied." Time delay 210 is an arbitrary period of time that is generated and added by password software 132 to prevent revealing any timing parameters of the stored password.

Predetermined time interval 206 follows initial entry event C1. Time T1 (segment time) is measured from the trailing edge of initial entry event C1 and represents the total amount of time of time interval 206 and entry event C2. Predetermined time interval 206 can be a user specified amount of time or a random time interval generated by the password generating portion (not shown) of password software 132. The time required for entry event C2 (and all subsequent entry events) is calculated by using the serial bit transfer rate (baud rate) of the actual incoming signal. The length of predetermined time interval 206 is calculated by subtracting the time of entry event C2 from the segment time T1. The second entry event C2, is compared to an incoming entry event (one or more computer readable signals) received by computer 100. Alternatively, time T1 may be calculated by starting the interval timer at a signal within a first group of signals that form an entry event and the ending within a second group of signals that form a subsequent entry event.

In all computer systems, there exists an inherent delay in the computer's processing time, which must also be taken into account when measuring time intervals. In the apparatus and method of the present invention, a plus or minus percentage deviation in baud rate and processing time is addressed by providing deviation window W1. Deviation window W1 is a deviation period that accommodates the additional times required for computer 100 to recognize and read a character or group of characters. The period of deviation window W1 is based on the baud rate of the incoming signals. Generally, a deviation window is plus or minus a percentage of the preceding time interval (see Table 1). Computer 100 recognizes entry event C2 during deviation window W1 and establishes time T1. Time T1 includes a password segment's predetermined time interval 206 and the character recognition time associated with entry event C2. Time T1 must end within deviation window W1. Time interval 206, entry event C1, and entry event C2 must match the password stored in computer 100 in order to be a valid password attempt.

If time T1 does not end within deviation window W1, then password software 132 detects the error and rejects the password attempt as invalid. Arbitrary time delay Td is added before sending the rejection of the password attempt to computer 106 that is requesting access. If time T1 ends within deviation window W1, the interval timer (not shown) that provides timing for the algorithm of the stored password is stopped, reset to zero, and then re-started for arbitrary time delay Td. A plurality of interval timers may be used to monitor time T1, time interval 206 and arbitrary time delay Td. At the conclusion of arbitrary time delay Td, if a correct password attempt has been presented, a successful password entry is acknowledged and access is granted.

Each entry event comprises of one or more predetermined entry signals that represent one or more numbers, letters, sounds, symbols, characters, etc., in any combination in the password structure. Those skilled in the art will appreciate that an entry event can, and usually does, comprise a plurality of groups of signals that represent a password.

Figure 2B:
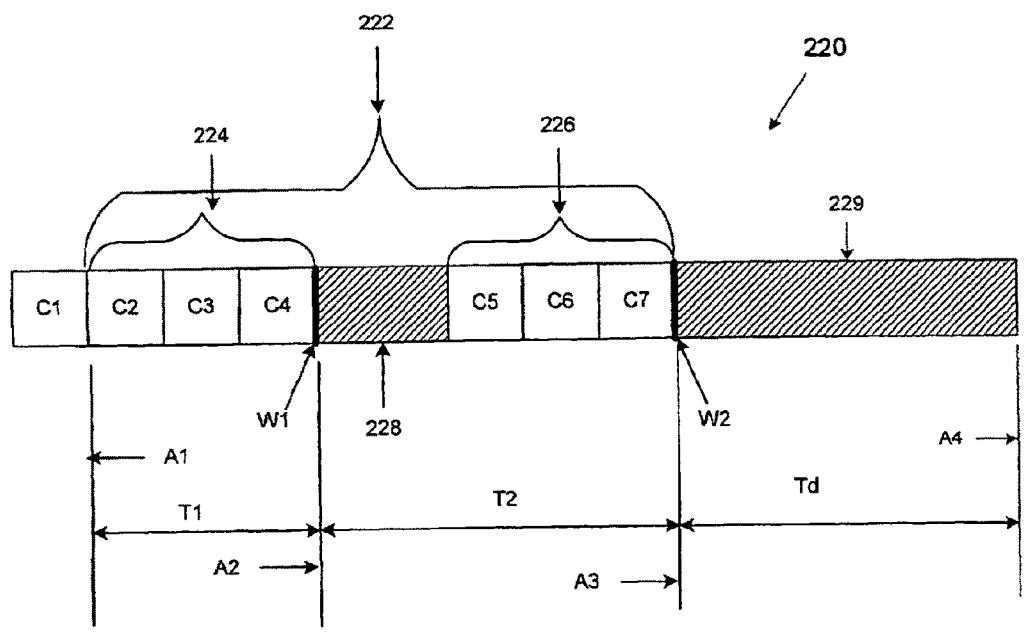

FIG. 2B illustrates a time-line of a password 220 according to another embodiment of the present invention. Password 220 comprises time envelope 222 (total time of the entire password 220) following an initial entry event C1, entry event 224 (comprising entry event C2, entry event C3, entry event C4, zero time interval and deviation window W1), time interval 228 and entry event 226 (comprising entry event C5, entry event C6, time interval 228, terminating entry signal C7 and deviation window W2). Each segment (at least one entry event) of the password must occur within password envelope 222. An arbitrary time delay, Td, that is equal to time segment 229 is then applied to the end of the password envelope 222 before sending an acceptance or a rejection of the presented password attempt to computer 106.

Figure 2C:
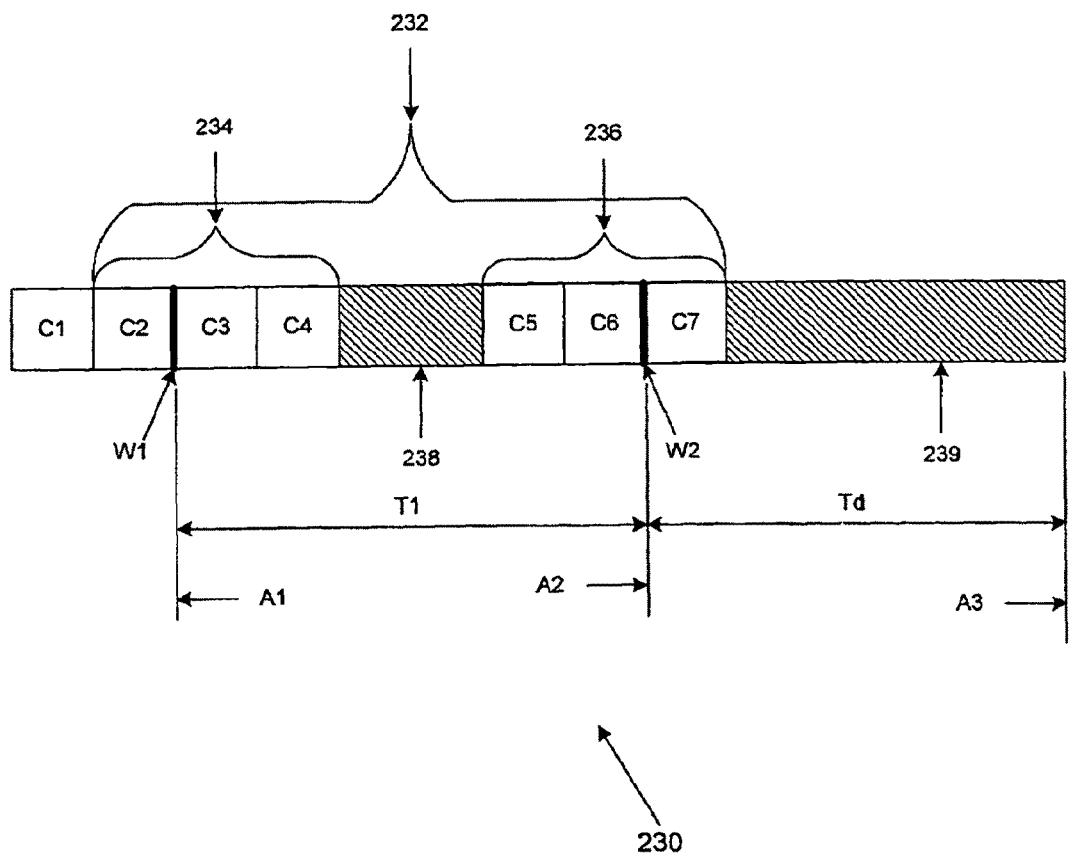

FIG. 2C illustrates a time-line of another password 230 according to another embodiment of the present invention. Password 230 comprises time envelope 232 following an initial entry event C1, entry event 234, time interval 238, entry event 236 and deviation windows, W1 and W2. Entry event 234 comprises entry signals C2, C3, and C4. Entry event 236 comprises entry signals C5, C6, and C7. In this embodiment, entry signal C1 is the initiating entry signal that triggers password software 132 to began comparing the incoming signals of a password attempt to the stored password. The total password 230, in this instance, comprises entry signals C2, C3, and C4, time interval 238, and entry signals C5, C6, and C7.

However, as predetermined by the user, interval timing begins at A1 in deviation window W1 after detecting the second entry signal at A1, continues through time interval 238, and ends in deviation window W2 upon detecting entry signal C6 at time A2. Then entry signal C7 is received. The password attempt is invalid if entry signal C7 is not detected. Password acceptance is delayed by an arbitrary amount of time Td. Time Td is the sum of the time of entry signal C7 and arbitrary time segment 239. Computer 100 then sends an "access denied" signal or an "access allowed" signal to computer 106 that is presenting the password attempt. The time Td is not a part of the presented password attempt and is not a part of the stored password. It is an element that is generated by password software 132 to mask the length of time envelope 232 so that computer 106 can not determine the length of the stored password.

Figure 2D:
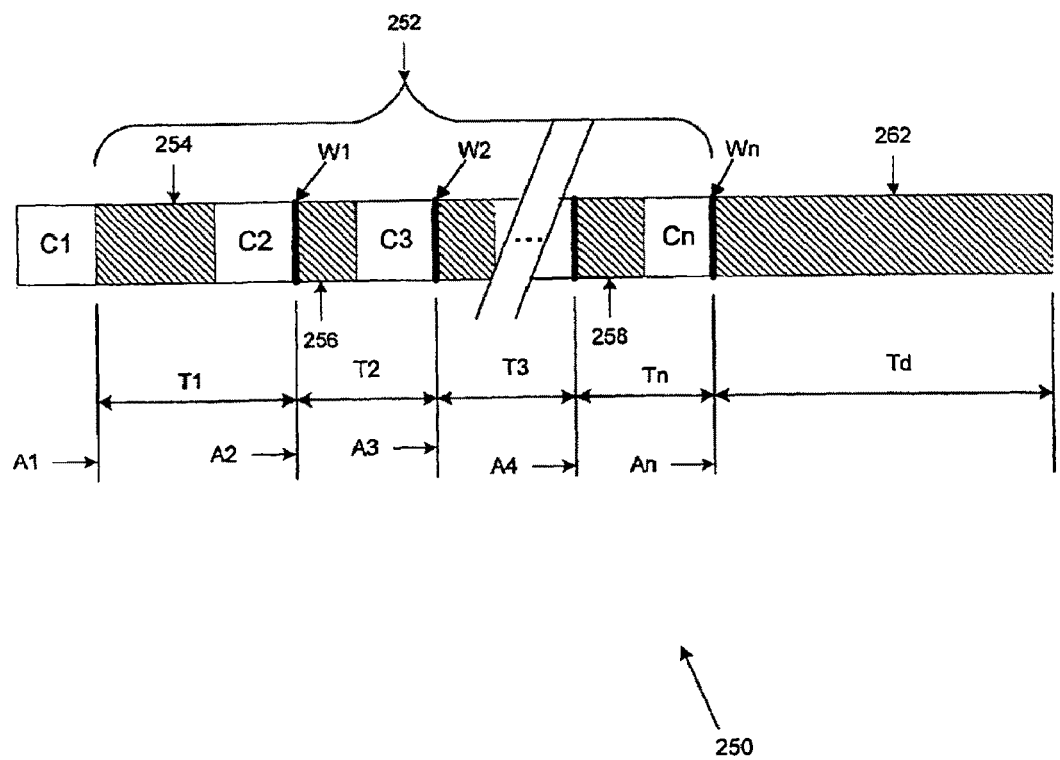

FIG. 2D illustrates a time-line of a password 250 that utilizes a plurality of password segments. Password 250 comprises time envelope 252 and entry signals C2, C3, . . . , and Cn, time intervals 254, 256, . . . , and 258, and deviation windows W1, W2, . . . , and Wn. Time envelope 252 is calculated from the trailing edge of initializing entry signal C1 to the trailing edge of entry signal Cn. Initializing entry signal C1 is detected by password software 132. The interval timer is then reset and begins timing time interval T1 at time A1. Time interval 254 is determined by subtracting the time of entry signal C2 time from time T1. Time T1 is the sum of time interval 254 and the time of entry signal C2 with a deviation factor of plus or minus a predetermined percentage of the total time. Deviation window W1 is typically a ten percent (10%) deviation.

Time interval 256 is determined by subtracting the time of entry signal C3 from time T2 which ends within deviation window W2. Time T2 is measured from the trailing edge of entry signal C2 to the trailing edge of entry signal C3. All the time intervals in this embodiment are determined in the same manner as time interval 254 and time interval 256. Times T1, T2, . . . , Tn may be utilized in an embodiment of the password, along with time intervals and deviation windows, as validation factors for a presented password attempt. Time Td is an arbitrary time delay 262 added when password software 132 sends an "access denied" signal or an "access allowed" signal to computer 106.

Figure 2E:
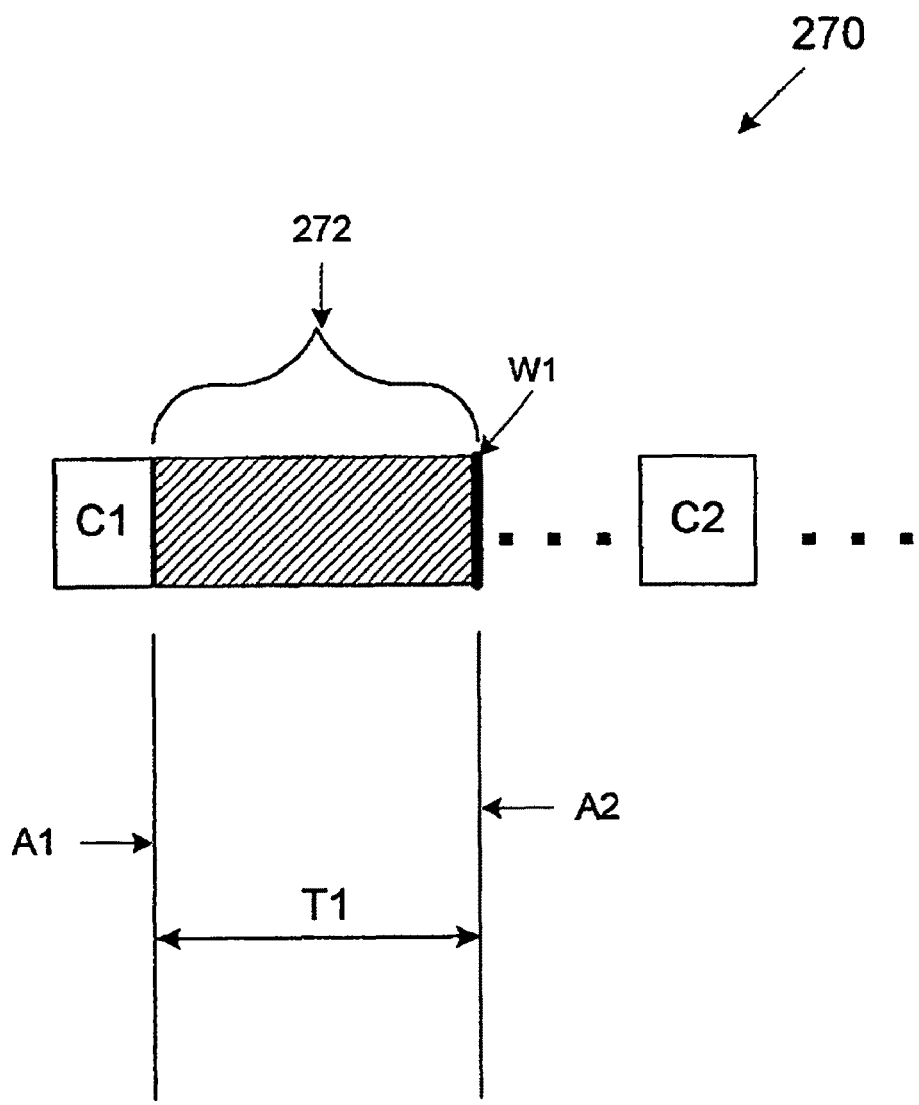

FIG. 2E depicts a time-line of a "time lockout" password 270 of the present invention. Initializing entry signal C1 signals password software 132 that a password attempt is being presented. The interval timer is reset and started at time A1. Time T1 272 is measured from the trailing edge of entry signal C1. Time T1 272 acts as a "time lockout" so that no other character entries will be considered by password software 132 before the interval timer, which began timing at time A1 completes time interval 272. Any entry signal attempts from computer 106 will be answered with an arbitrary time delay Td (not shown) and an "access denied" signal sent to computer 106. Furthermore, time T1 must be complete (i.e., timed lockout ends within deviation window W1) before another entry event will be considered by password software 132. For example, a user may want to secure his computer overnight. In the process of activating the overnight password, the computer prompts the user for the password character(s) and the length of the desired lockout time T1. After the lockout time T1 has elapsed, password software 132 will then consider password entry attempts. Even so, the correct password, in this example entry event C2, must be entered to permit access to computer 100.

Each of the time intervals in a password can be any user-determined period of time. Further, the identity of the additional characters can (and should) be different from one another. A user can select time intervals and entry signals for inclusion in a password. Table 1 provides more detailed information concerning time intervals and entry signals for the time-line of password 250 shown in FIG. 2D.

TABLE 1

| Time Interval | Entry Event | Entry Event Time | Time T | Deviation |
|---|---|---|---|---|
| | C1 | | | |
| 999 ms (254) | C2 | 1 ms | 1000 ms | 900 ms < W1 < 1100 ms |
| 498 ms (256) | C3 | 2 ms | 500 ms | 450 < W2 < 550 ms |
| ... | ... | ... | ... | ... |
| n ms (258) | Cn | 3 ms | (n + 3) ms | n ± 0.1 (N + 3) ms |

Table 1 indicates that password software 132 would read the first two segments in a maximum time of 1650 milliseconds (ms) Any additional time intervals and entry events add to the time of the time envelope. However, this does not include the variable and arbitrary time delay Td to disguise the actual length of time of the password.

The following password format is a literal representation of one embodiment of the password algorithm:

$$C1@A1+C2@A2+C3@A3+ \ldots +Cn@An+Td \quad (1)$$

where "C1" is a password initiating entry signal (or entry event); "A1" is the point that the interval timer is reset and begins timing; "A2, A3 . . . and An" are the timing points for subsequent entry events and time intervals; "C2, C3, etc.," are individual entry events that can comprise one or more computer readable signals which include characters, numbers, symbols, etc.; "Cn" is the "nth" entry event; and "Td" is a variable time delay that password software 132 waits after determining whether a password attempt is acceptable to disguise the true time of the stored password when allowing or denying entry.

As discussed previously, one of the most common schemes used by hackers is a so-called "dictionary" attack. A dictionary attack provides multiple combinations of entry events, but requires continual confirmation from the computer system under attack to confirm any correct entries. A powerful feature of the present invention requires that the hacker wait until the entire password attempt is entered before determining whether the password attempt is correct. By restricting the confirmation of a successful password attempt until the password attempt is complete in real time, the present invention prevents a hacker from determining whether progress is being made. Effectively, the hacker has to wait for the entry of a complete password attempt which may require a time of several microseconds, or eight hours, or many days.

For example, if an authorized user selected a password that included multiple time entries and entry events that totaled ten (10) seconds, each password attempt would have to be exactly ten (10) seconds long. A hacker using computer 106 would only be permitted a password attempt once every ten (10) seconds. Even if the hacker was aware that a time based password was protecting computer 100 and presented time markers for verification, the password confirmation of the present invention includes a variable time delay, Td, that password software 132 adds before sending the message "access denied." This variable, and arbitrary, time delay is added to the password attempt and masks the true length of the stored password. The combinations could be virtually endless. A stored password could have a total time interval of eight hours or more. A stored password that might have a length of eight hours or more would discourage most hackers. Additionally, the arbitrary and variable time delay that password software 132 waits before responding to computer 106 provides a mask for the true time envelope of the stored password.

Figure 3:
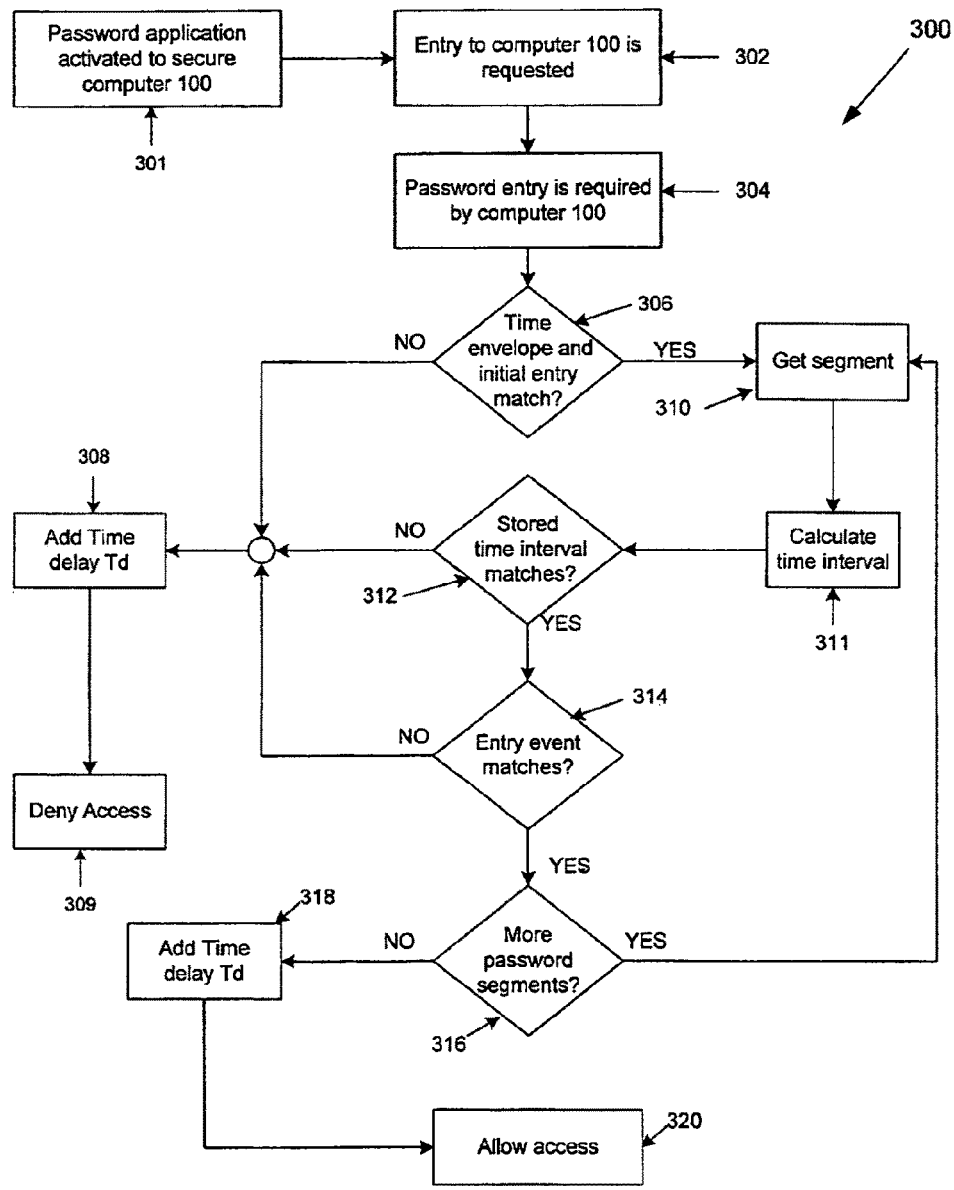
FIG. 3 is a high-level flow diagram illustrating the operation of an exemplary computer password protection system according to one embodiment of the present invention.

FIG. 3 depicts a high-level flow diagram illustrating the operation of an exemplary computer password protection system according to one advantageous embodiment of the present invention. The process steps are generally referred to with reference numeral 300. The process begins with a password being established and stored in computer 100, where computer 100 is subject to online entry, either authorized or unauthorized (process step 301). After the stored password is in place, an online entity (for purposes of this example, attacking computer 106) attempts to gain access to computer 100 via a modem or other communication interface device (process step 302). Protected computer 100 signals to the attacking computer 106 that a password is required (process step 304).

The attacking computer 106 transmits a password attempt in order to gain entry to the protected computer 100. Since the stored password of the present invention requires a complete password attempt before notifying attacking computer 106 of success or failure, a determination is made whether the time envelope (time measured from the first keystroke to the last keystroke) of a completely entered password attempt matches the stored password. After detecting an initial entry event (signal), the presented password attempt must be completely entered and submitted before any entry confirmation or denial is sent to attacking computer 106 (process step 306).

If the time envelope of the presented password attempt does not match the time envelope of the stored password for protected computer 100, the method of the present invention waits for an arbitrary time, time Td (process step 308) and access is denied to attacking computer 106 (process step 309). If the time envelope of the password attempt entered by attacking computer 106 matches the time envelope of the stored password, then protected computer 100 gets a first password segment (process step 310). Next, the method calculates the first time interval of the first segment (process step 311). If the first time interval (i.e., the time T1 minus the time of the entry event in the time segment) does not match the stored time interval of the first segment (process step 312), then the method of the present invention waits for an arbitrary time, time delay Td (process step 308) before notifying attacking computer 106 that access is denied (process step 309).

If the determination is made that the time interval of the first password segment of attacking computer 106 matches the time interval of the first segment of the stored password in computer 100, then the method of the present invention makes a determination of whether the entry event associated with the time interval matches the corresponding entry event of the stored password (process step 314). If there is no match, the method of the present invention waits for an arbitrary time, time delay Td (process step 308), and denies access to attacking computer 106 (process step 309). If there is a match, then the method of the present invention determines whether there are more password segments to be checked (process step 316). If there are more password segments, the method of the present invention then gets the next password segment (process step 311) and repeats the cycle of determining whether entry events and time intervals match (process steps 311-314).

If a determination is made in process step 316 that there are no more password segments (time interval and associated entry events) detected in the incoming password attempt, the incoming password attempt is deemed to present a valid password. The computer then waits an arbitrary period of time, Td, to mask the true length of the time envelope of the stored password (process step 318). The method of the present invention then grants access to protected computer 100 (process step 320).

The exemplary embodiments described above may be constructed from entries received from a computer keyboard. In other words, a user may design a stored password and password software 132 constructs the designed stored password. However, a stored password may be constructed automatically by utilizing a password software 132 that comprises a random character generator. Password software 132 can construct a stored password by inserting characters or signals for each entry event and by designating time intervals between the entry events. Thus, it is possible to generate a stored password that may be unknown to the password holder but is stored on a floppy disk (or other similar memory device). The password holder can use the password on a floppy disk to obtain access to computer 100. For remote access to computer 100, the holder of the stored password inserts the floppy disk into a remote computer 106. The floppy disk provides the stored password for remote entry access to protected computer 100. Even though storage of the stored password on a floppy disk may make computer 100 less secure, the stored password is useful if authorized access from a remote computer is required.

Figure 4:
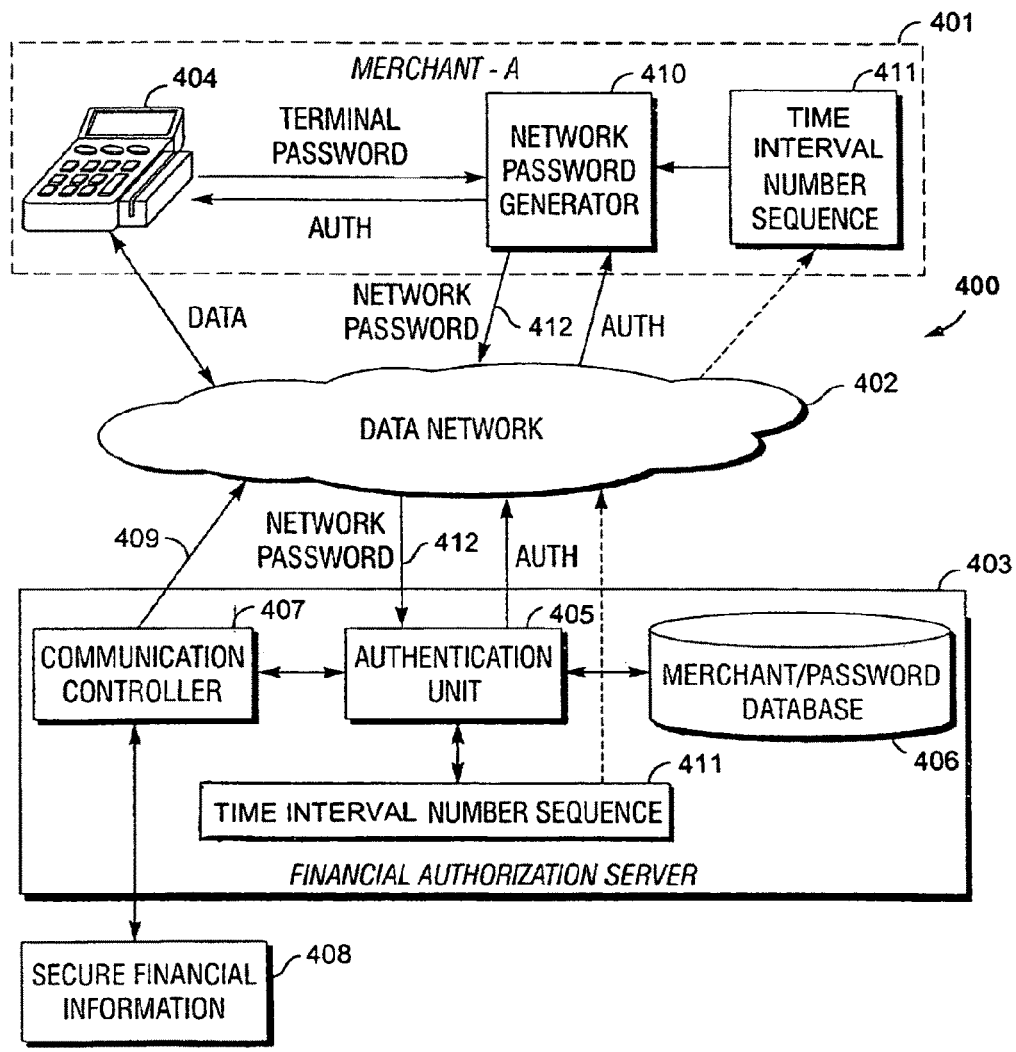
FIG. 4 is a simplified functional block diagram of an exemplary financial authorization network modified in accordance with the teachings of the present invention.

FIG. 4 is a simplified functional block diagram of an exemplary financial authorization network 400 modified in accordance with the teachings of the present invention. A plurality of merchant terminals such as Merchant-A 401 communicate through a data network 402 with a financial authorization server 403. Each merchant terminal 404 includes a magnetic card reader or equivalent device for inputting customer identification and/or credit information. The merchant terminals may be further connected on the merchant side with a point-of-sale (POS) system or intranet (not shown). The data network may be, for example, an Internet Protocol (IP)-based local area network (LAN), wide area network (WAN), or the Internet. The financial authorization server may include an authentication unit 405, a merchant/password database 406, and a communication controller 407.

In conventional operation, each merchant, for example Merchant-A 401, activates his terminal each morning when the merchant prepares to open for business. The terminal includes a serial number, and the merchant enters an ID number or password assigned to him by the operator of the financial authorization network. Together, the serial number and the ID number/password comprise a prior art terminal password that is transmitted through the data network 402 to the financial authorization server 403. The terminal password is received in the authentication unit 405, which accesses the merchant/password database 406 and compares the received terminal password with a stored password. If the passwords match, the authentication unit approves Merchant-A's terminal for financial transactions and sends an approval indication to the terminal. Thereafter, when a customer's credit card is read at the merchant terminal 404, the card number together with the terminal serial number are sent to the financial authorization server. The authentication unit 405 recognizes the serial number as being approved and sends the credit card information to the communication controller 407. The communication controller then accesses secure financial information 408 to determine whether the credit card number is approved for the transaction. The controller then returns either a positive or negative indication 409 to the Merchant-A terminal.

In some networks, the merchant terminal may send its terminal password along with each credit card transaction. When the authentication unit 405 positively authenticates the password, the credit card information is passed to the communication controller 407 for access to the secure financial information 408.

In the present invention, the merchant terminal environment is modified to include a network password generator 410. The network password generator may be implemented internally in the merchant terminal or in a separate unit that interfaces with the merchant terminal. The terminal sends its standard terminal password (e.g., serial number and merchant ID) to the network password generator. A time interval number sequence 411 is also input to the network password generator, which generates a time-multiplexed network password 412 by inserting the appropriate time intervals between the packets of the terminal password, as specified by the time interval number sequence. The time interval number sequence may be input via a standard network connection from the financial authorization server, via a secure encrypted connection, or via a physical medium such as a CD delivered to the merchant.

The network password generator 410 then sends the time-multiplexed network password 412 through the data network 402 to the server 406. The authentication unit 407 receives the network password and compares the characters received with a stored password in a merchant/password database 408. The authentication unit also compares the time intervals between the received characters with the current number set from the time interval number sequence 411, which is shared between the terminal and the server. The authentication unit positively authenticates the network password only if the received characters match the stored characters, and the time intervals between the received character-carrying packets matches the number specified by the time interval number sequence.

If the network password 412 is accompanied by a credit card number from a credit card transaction, and the authentication unit network positively authenticates the password, the credit card information is passed to the communication controller 407 for access to secure financial information 408.

In an alternative embodiment, the time interval number sequence 411 is stored only in the authorization server 403. Following a successful verification, the server sends a response message back to the merchant terminal. The response may include a next interval or set of intervals to be used by the terminal to create the time multiplexed network password. The intervals may be encoded in the response message to prevent interception by hackers or snoopers. Alternatively, the response message may include a value or values that do not directly indicate the time interval(s) to be inserted by the terminal. Instead, the terminal may be programmed with a formula that calculates the time intervals based on the value(s) received from the server. Alternatively, the terminal may include a lookup table that associates each value received from the server with a corresponding time interval to be inserted in the password.

For example, if the same time interval is to be placed between each of the characters in the password, the server may send a single value such as 24. The terminal may calculate a time interval from the value 24, or may associate a time interval with the value 24 in a lookup table, to determine that an interval such as 150 ms is to be placed between each character in the password. If a different time interval is to be placed between each of the characters in a password having, for example, 5 characters, the server may send a string of values such as 24, 10, 18 and 5. The terminal may calculate a time interval from each of the received values, or may associate a time interval with each of the received values in a lookup table, to determine four time intervals to place between the five characters. For example, time intervals such as 150 ms, 75 ms, 250 ms, and 1 second may be determined and placed between the characters in the password. Alternatively, the lookup table may associate a single value with a sequence of time intervals. Thus, the server may send a single value such as 24, and the terminal may determine that the intervals 150 ms, 75 ms, 250 ms, and 1 second are to be placed between the characters in the password.

Figure 5:
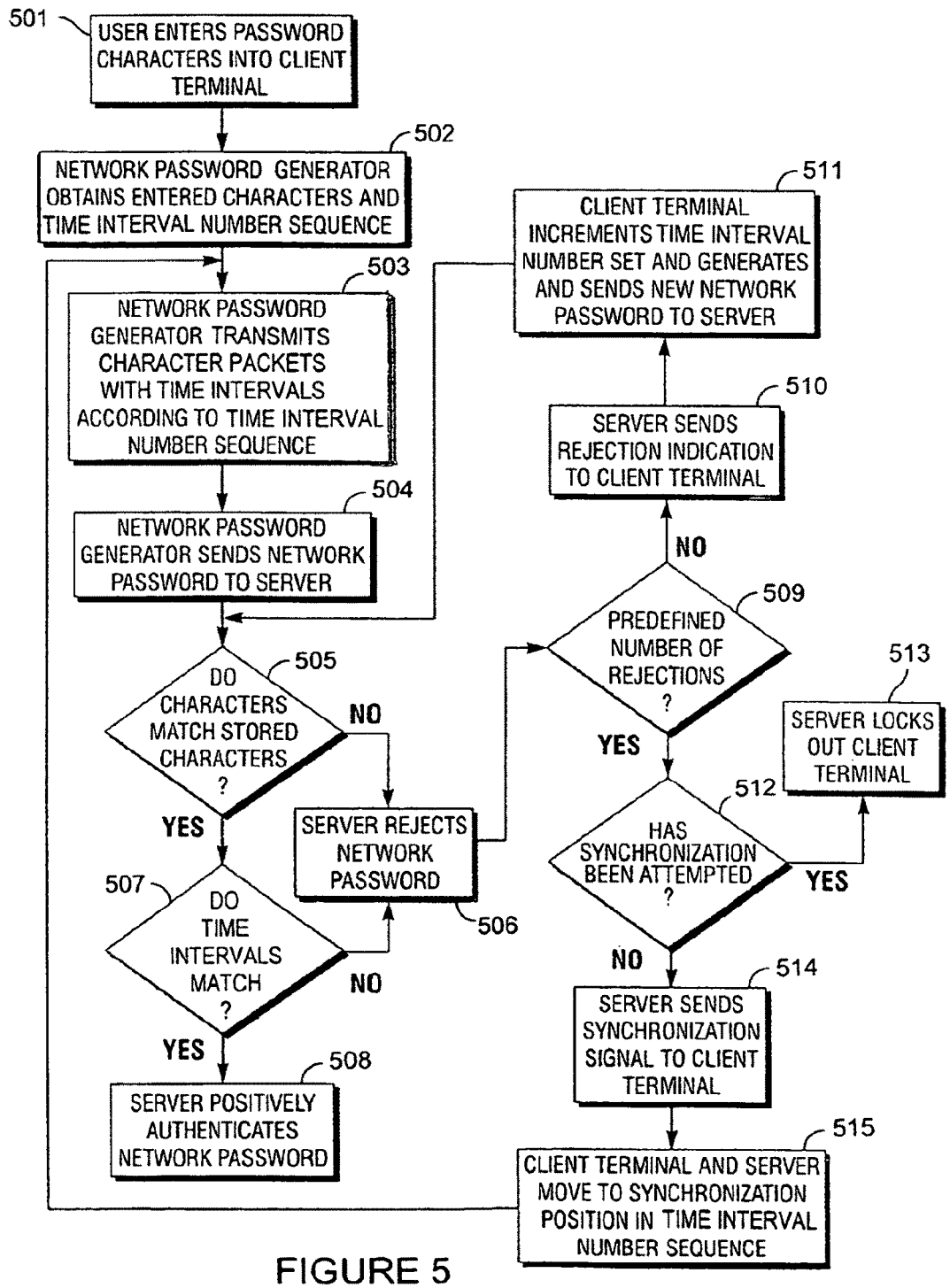
FIG. 5 is a high-level flow diagram illustrating the steps of an exemplary embodiment of a method of generating and authenticating a password according to the teachings of the present invention.

FIG. 5 is a high-level flow diagram illustrating the steps of an exemplary embodiment of a method of generating and authenticating a password according to the teachings of the present invention. Starting at step 501, a user enters the characters of a password into a client terminal. At step 502, a network password generator associated with the client terminal obtains the entered password characters from the client terminal and obtains a time interval number sequence that is shared with an authentication server. At step 503, the network password generator places the characters in packets and transmits the character packets with the appropriate time intervals between the packets in accordance with the time interval number sequence. At step 504, the network password generator sends the network password to the server.

At step 505, an authentication unit associated with the server determines whether or not the characters received in the network password match the characters of a stored password associated with the client terminal. If not, the process moves to step 506 where the server rejects the network password. However, if the characters match at step 505, the process moves to step 507 where the authentication unit determines whether or not the time intervals between each pair of character-carrying packets matches the time intervals specified by the time interval number sequence. If the time intervals match at step 507, the process moves to step 508 where the server positively authenticates the network password. However, if the time intervals do not match, the process moves to step 506 where the server rejects the network password.

The process then moves to step 509 where the server determines whether this client terminal has experienced a predefined number of password rejections. If not, the process moves to step 510 where the server sends a rejection indication to the client terminal. At step 511, the client terminal increments the time interval number set and generates and sends a new network password to the server. The process then returns to step 505 and repeats the authentication process for the new password.

If it is determined at step 509 that the client terminal has experienced the predefined number of password rejections, the process moves to step 512. Since multiple password rejections may be caused by the client terminal and server being out of synch regarding the correct position in the time interval number sequence, the process determines at step 512 whether or not synchronization has already been attempted. If so, the process moves to step 513 where the server locks out the client terminal. However, if synchronization has not yet been attempted, the process moves to step 514 where the server sends a synchronization signal to the client terminal specifying a synchronization position in the time interval number sequence, or alternatively, instructing the client terminal to go to a predefined synchronization position. At step 515, both the client terminal and the server move to the synchronization position in the time interval number sequence. The process then returns to step 503 where the network password generator generates a new password using the characters entered by the user and inserting time intervals between the character-carrying packets in accordance with the synchronization position in the time interval number sequence. The process then continues with the authentication procedure. If the client terminal is an authorized terminal that was temporarily out of synch with the server, the synchronization process should correct the problem, and the password should be positively authenticated. If the client terminal is a hacker, who does not know to insert time intervals or does not have access to the time interval number sequence, the synchronization process will not correct the problem, and the hacker will be denied access.

A benefit of the present invention is that it is transparent to the user. That is, the user always uses the same terminal (with the same serial number) and the same password or ID for every transaction. The terminal and server change the network password as often as the network operator desires by changing the time intervals between packets in the manner and at the frequency defined by the network operator. The user does not have to remember multiple passwords or change his password on a periodic basis. Even if a hacker knows the user's password, the hacker cannot gain access. Since any time interval can be inserted between any two characters in the password, the combination of characters and time intervals is practically limitless. Also, the system may change the time intervals between each pair of password characters as often as each transaction. Therefore, even if a hacker intercepts a transmission and determines the time intervals between each pair of character-carrying packets, the intervals may change in the next transmission, denying the hacker access to the network.

Figure 6:
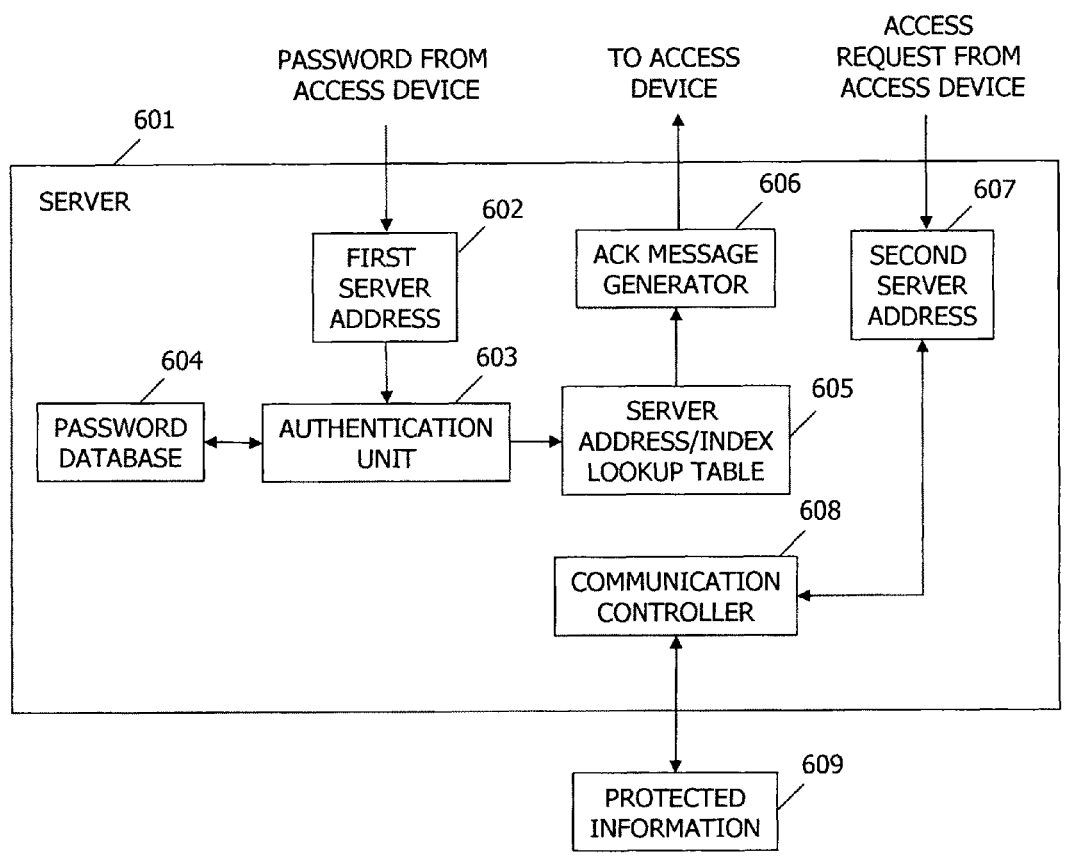
FIG. 6 is a simplified functional block diagram of an exemplary authentication server in another embodiment of the present invention.

FIG. 6 is a simplified functional block diagram of an exemplary authentication server 601 in another embodiment of the present invention. In this embodiment, designed to defeat a hacker who has obtained a user's password, the server authenticates the password and then redirects the access device to another IP address 607 known only to authorized access devices. A password is received from the access device at a first server address 602. An authentication unit 603 authenticates the password by comparing the received password with a password stored in a password database 604. Upon successful authentication, a server address/index lookup table 605 is accessed to obtain an index for the second server address 607.

An acknowledgment message generator 606 creates an acknowledgment message and includes the index of the second server address. The index may be randomly generated to preclude patterns in the use of server addresses. The server sends the acknowledgement message to the access device. The access device also includes a server address/index lookup table (which may be in a protected area), where the access device determines the second server address. The access device then sends an access request to the second server address 607. Upon receipt of the access request at the second server address, the server 601 provides the access request to a communication controller 608 and access is granted to protected information 609.

It should be noted that this embodiment is also effective against phishing sites where the user has been directed to a fake website which simulates a real website such as the website for the user's bank. The hacker may request the user to enter his password and his account number at the fake website. The hacker then attempts to access the user's account at his bank utilizing this information. With this embodiment, however, the access device expects to receive a proper index value pointing to another address in the client's lookup table. If no such index is received, or if an improper index is received, the client device may alert the user that he may be at a fake website. Note that if the hacker returns a proper index, he will lose the user because the access device will switch to a different address to send the access request to the server.

Figure 7:
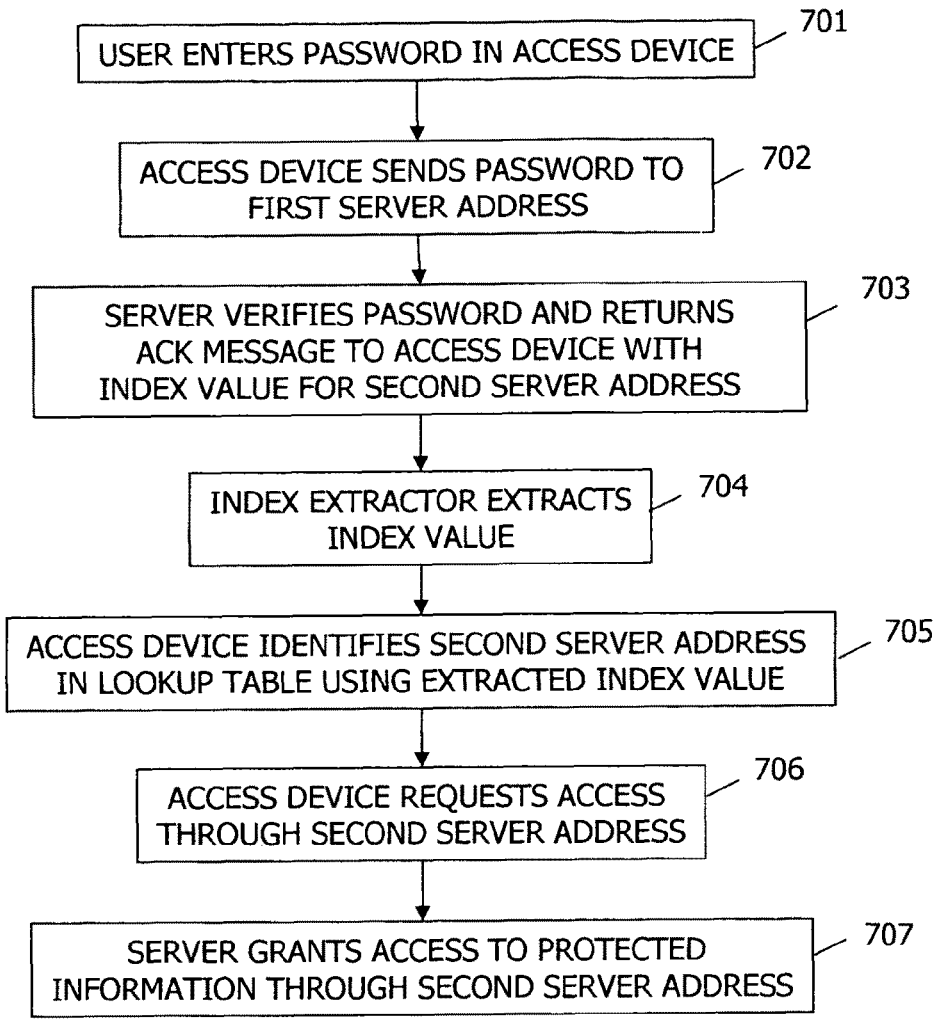
FIG. 7 is a high-level flow diagram illustrating the steps of an exemplary embodiment of a method of authenticating a password performed by the server of FIG. 6.

FIG. 7 is a high-level flow diagram illustrating the steps of an exemplary embodiment of a method of authenticating a password performed by the server of FIG. 6. At step 701, the user enters his password in an access device. At step 702, the access device sends the password to the first server address 602. At step 703, the server verifies the password and returns an acknowledgment message to the access device with an index value for the second server address 607. At step 704, an index extractor in the access device extracts the index value. At step 705, the access device identifies the second server address in a lookup table using the extracted index value. At step 706, the access device requests access through the second server address 607. At step 707, the server grants access to the protected information 609 through the second server address.

Figure 8:
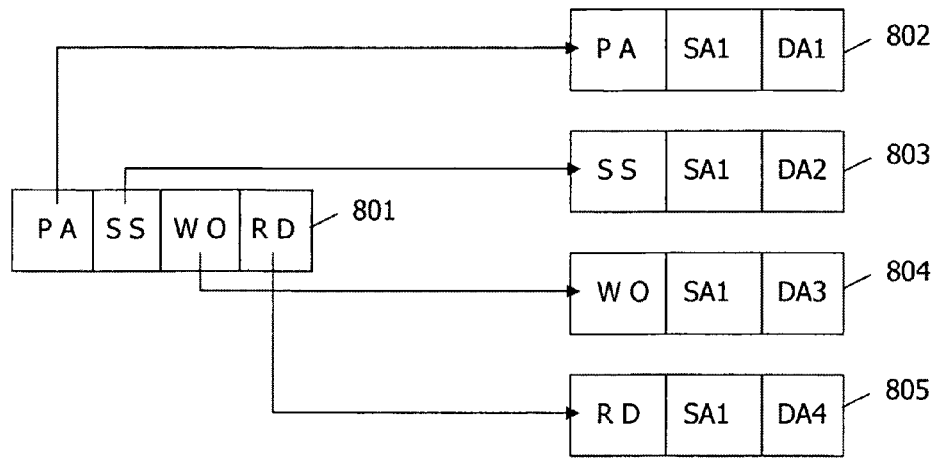
FIG. 8 illustrates an exemplary embodiment of a multi-character password divided into segments and placed into different data packets in accordance with another embodiment of the present invention.

FIG. 8 illustrates an exemplary embodiment of a multi-character password divided into segments and placed into different data packets in accordance with another embodiment of the present invention. In this embodiment, multiple IP addresses are assigned to the server, and are known only to authorized access devices. The access device divides the password 801 into multiple segments and places each segment in a different packet 802-805. The header of each packet includes an identifier such as a source address (SA1) that identifies the access device. Each packet header also includes a different one of the multiple IP addresses of the server as a destination address. The access device then sends the packets individually to the server. In one embodiment, the access device delays transmission of successive packets by predefined time periods known only to the access device and the server. Any hacker who has learned one of the server's IP addresses, and is monitoring that address to intercept passwords, will see only one portion of the user's password.

Figure 9:
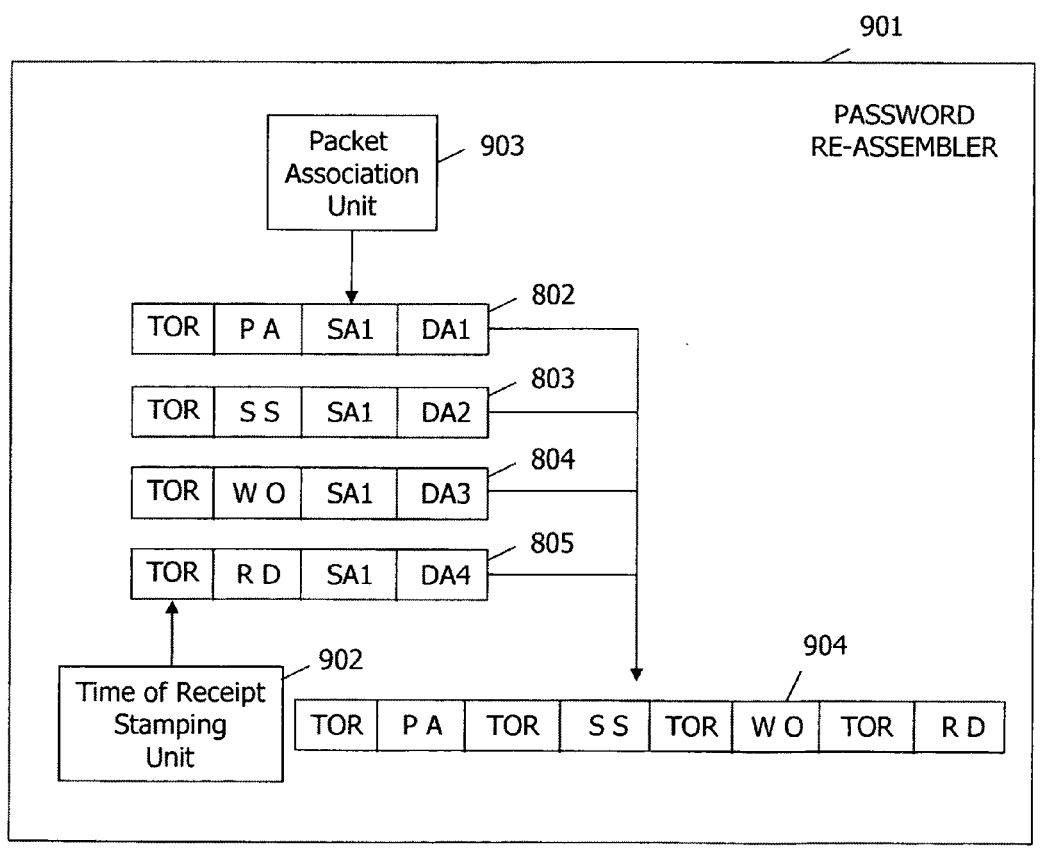
FIG. 9 is a simplified functional block diagram of an exemplary password re-assembler in an authentication server suitable for reassembling the password of FIG. 8.
Figure 10:
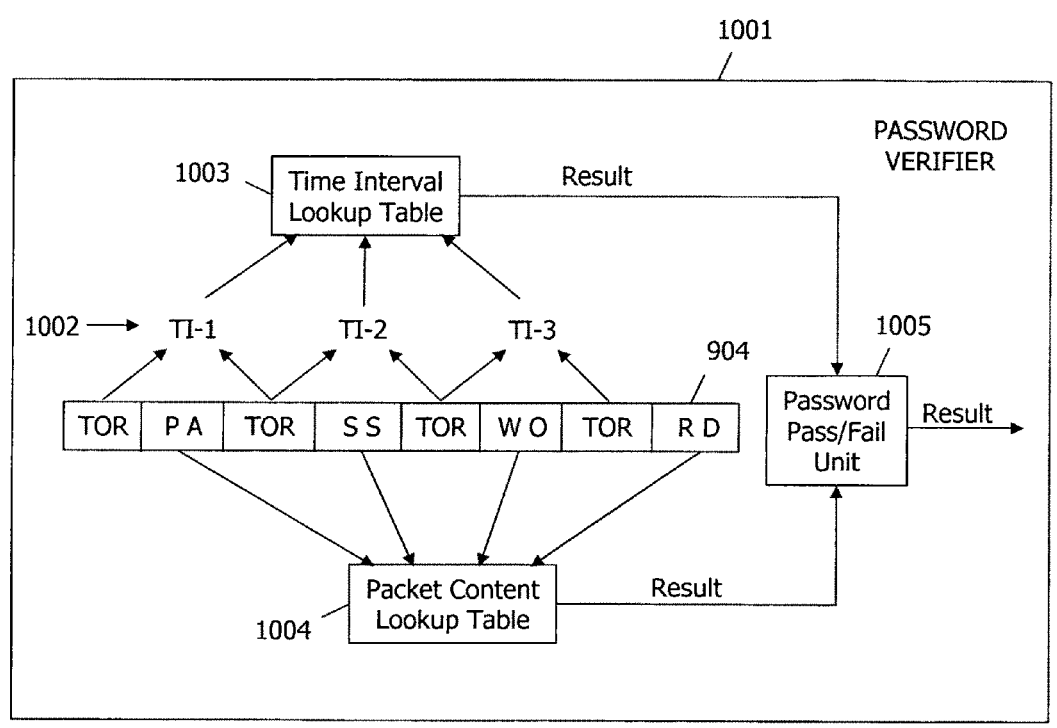
FIG. 10 is a simplified functional block diagram of an exemplary password verifier in an authentication server suitable for verifying the reassembled password shown in FIG. 9.

FIG. 9 is a simplified functional block diagram of an exemplary password re-assembler 901 in an authentication server suitable for reassembling the password of FIG. 8. Upon receiving each packet at the server, a time-of-receipt stamping unit 902 places a time-of-receipt stamp on each incoming packet 802-805. A packet association unit 903 may use the identifier of the access device or other identifier to associate the different packets which comprise the password. The data portions of the associated packets are then combined into a reassembled password 904 and sent to a password verifier 1001 (FIG. 10). If time delays are also being utilized as a second or third factor of the password, the time-of-receipt stamps are also sent to the password verifier.

FIG. 10 is a simplified functional block diagram of an exemplary password verifier 1001 in an authentication server suitable for verifying the reassembled password 904 of FIG. 9. If time delays are being utilized as a second or third factor of the password, the verifier calculates the difference between each succeeding time-of-receipt stamp to determine time intervals 1002, labeled as TI-1 through TI-3 in FIG. 10. A time interval lookup table 1003 determines whether the calculated time intervals match stored time intervals associated with the access device. A tolerance factor may be applied to account for small variances in the time intervals due to timing delays in the data network between the access device and the server. The result is sent to a password pass/fail unit 1005. Likewise, a packet content lookup table 1004 determines whether the data portions of the reassembled password match stored packet content information associated with the access device. The result is sent to the password pass/fail unit. The password pass/fail unit verifies the password only if the password characters are correct, the packet content of each packet is correct, and the time intervals between packets are correct, within any predefined tolerance values.

Figure 11:
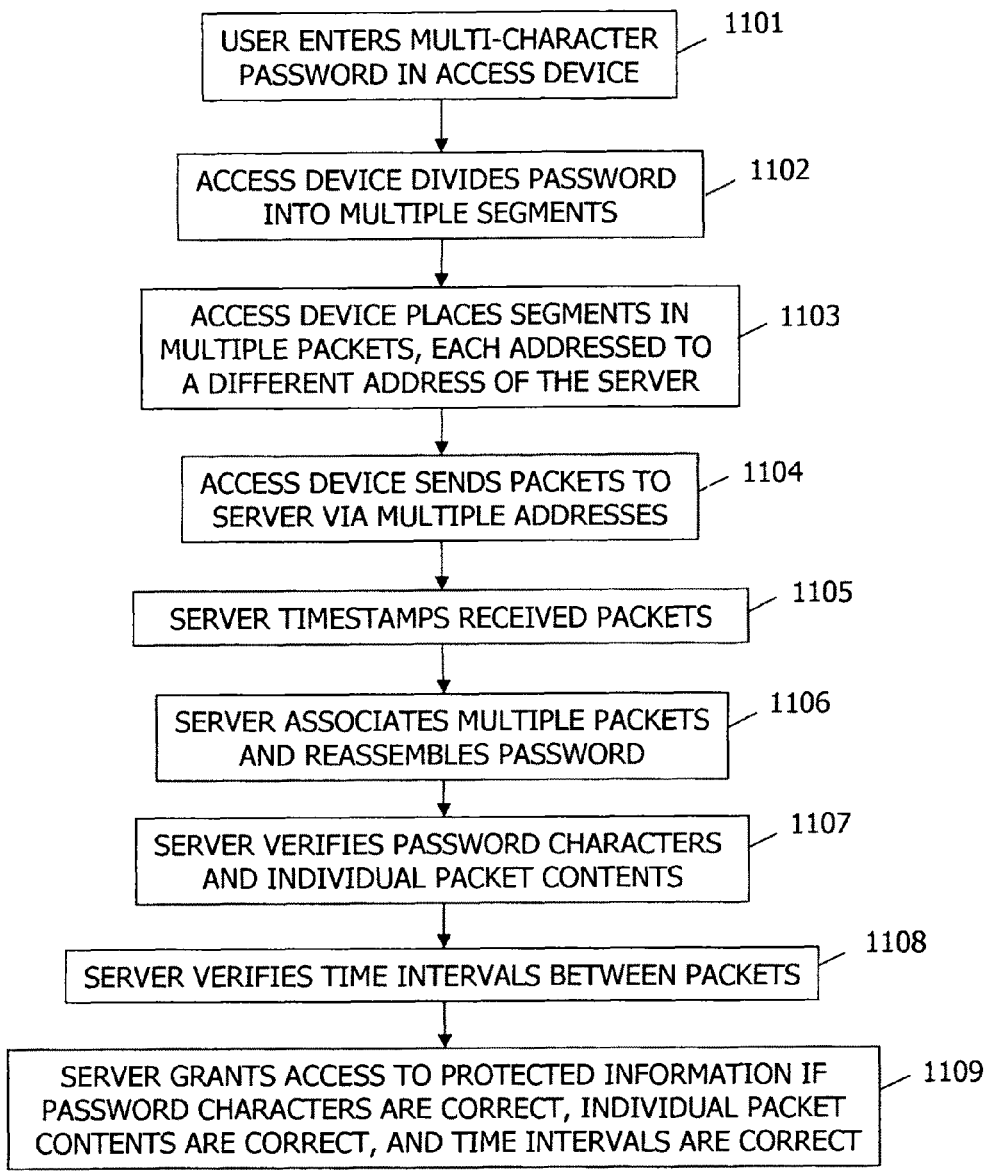
FIG. 11 is a high-level flow diagram illustrating the steps of an exemplary embodiment of a method of sending, reassembling, and verifying the password of FIG. 8-10.

FIG. 11 is a high-level flow diagram illustrating the steps of an exemplary embodiment of a method of sending, reassembling, and verifying the password of FIGS. 8-10. At step 1101, the user enters a multi-character password in the access device. At step 1102, the access device divides the password into multiple segments. At step 1103, the access device places the segments in multiple packets, each addressed to a different address of the server. At step 1104, the access device sends the packets to the server via the multiple server addresses.

At step 1105, the server receives the packets and places a time-of-receipt stamp on each received packet. At step 1106, the server utilizes the identifier of the access device to associate the multiple packets and reassemble the password. At step 1107, the server verifies that the password characters of the reassembled password are correct, and the packet contents of each individual packet match stored packet contents associated with the access device. At step 1108, the server calculates time intervals between the packets and verifies that the calculated time intervals match stored time intervals associated with the access device. At step 1109, the server grants access to protected information if the password characters are correct, the packet content of each packet is correct, and the time intervals between packets are correct, within any pre-defined tolerance values.

Figure 12:
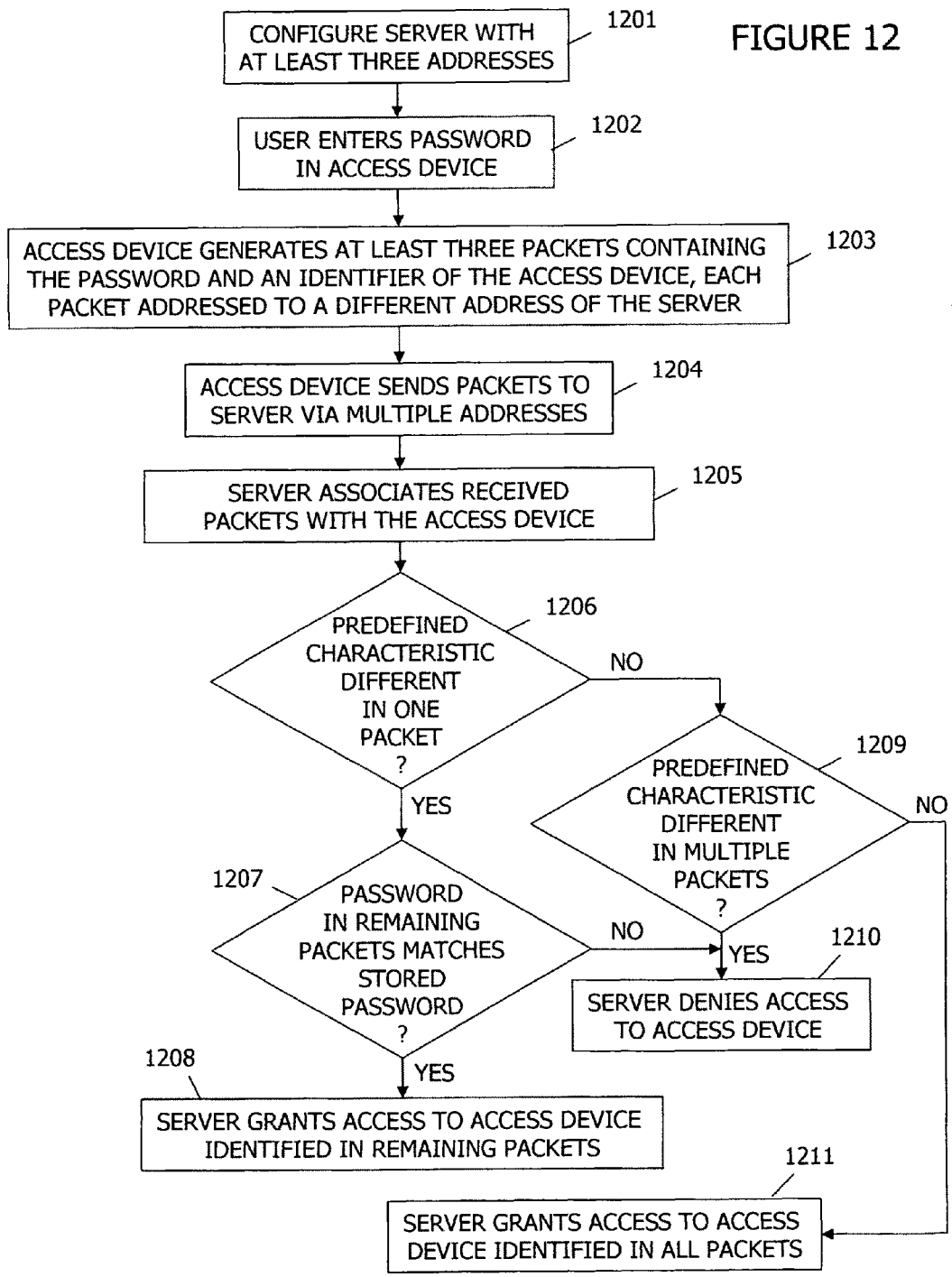
FIG. 12 is a high-level flow diagram illustrating the steps of another exemplary embodiment of a method of generating and authenticating a password according to the teachings of the present invention.

FIG. 12 is a high-level flow diagram illustrating the steps of another exemplary embodiment of a method of generating and authenticating a password according to the teachings of the present invention. In this embodiment, multiple addresses are assigned to the server, and are known only to authorized access devices. The access device sends its password in different packets to several of the server's addresses. If a hacker intercepts one of the password packets and attempts to gain access, a predefined characteristic of the packet will be changed. For example, the access device may transmit the packets with time delays known to the server. The hacker's interception and modification of a packet will cause an excessive delay, which is recognized by the server. Thereafter, the server may deny access or may grant access to the access device identified in the packets that were timely received.

At step 1201, the server is configured with at least three addresses. At step 1202, the user enters his password in the access device. At step 1203, the access device generates at least three packets containing the password and an identifier of the access device. Each packet is addressed to a different address of the server. At step 1204, the access device sends the packets to the server via the multiple addresses. The packets may be transmitted with one or more predefined time delays between the subsequent packets.

At step 1205, the server receives the packets and utilizes the identifier to associate the received packets with the access device. At step 1206, the server determines whether a predefined characteristic is different in one of the received packets. This characteristic may be, for example, the identifier of the access device, a source address, or the expected time of receipt of the packet. If a predefined characteristic is different in one of the received packets, the method moves to step 1207, where the server determines whether the password in the remaining packets matches a stored password for the identified access device. If so, the method moves to step 1208, where the server grants access to the access device identified in the remaining packets. If the password in the remaining packets does not match the stored password for the identified access device, the method moves instead to step 1210, where the server denies access to the access device.

If it is determined at step 1206 that the predefined characteristic is not different in one of the received packets, the method moves to step 1209 where it is determined whether the predefined characteristic is different in multiple packets. If so, the method moves to step 1210 where the server denies access to the access device. If the predefined characteristic is not different in multiple packets at step 1209, then it is the same in all received packets. Therefore the method moves to step 1211 where the server grants access to the access device identified in all received packets.

Figure 13:
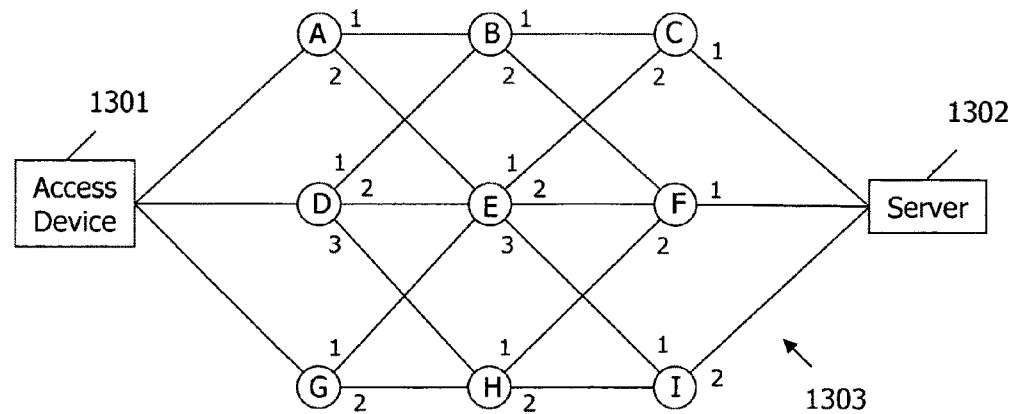
FIG. 13 illustrates a data network topology in which forced packet routing is implemented.

FIG. 13 illustrates a data network topology in which forced packet routing is implemented. In one embodiment, routers in the network are modified with a dynamic routing table. When a packet is received with a predefined destination address associated with, for example a financial institution, the router is programmed to send the packet out on a designated port. For example, an access device 1301 may send password packets over a network 1303 to a server 1302 located at a bank. Router-A may be programmed to send packets with the bank's destination address on port 1 to Router-B. Likewise, Router-B may be programmed to send packets with the bank's destination address on port 1 to Router-C. At some later time, the routing table may be modified so that Router-A sends packets with the same destination address on port 2 to Router-E, which is programmed to send the packets through either port 1, 2, or 3 to Router-C, Router-F, or Router-I, respectively. Thus, rather than letting the routers choose the shortest path or lightest loaded path, which may almost always be the same, the routers are forced to vary the path according to their dynamic routing tables.

In one embodiment of the present invention, the access device 1301 divides the password into multiple segments and sends each segment in a different packet to a different router. The first packet may be sent to Router-A, the second packet to Router-D, and the third packet to Router-G, for example. Each packet includes the bank's address as its destination address. Each router uses its dynamic routing table to further route the packet it receives. If a hacker is monitoring a router such as Router-D because it is on the shortest path to the server 1302, the hacker will only see the second packet and will not learn all of the characters of the password.

In another embodiment of the present invention, the server 1302 has multiple IP addresses which are known to the access device 1301. The access device divides the password into multiple segments and sends each segment in a different packet. Each packet is addressed to a different IP address of the server. The routers in this embodiment may be configured with static routing tables. When a packet is received with a predefined destination address, the router is programmed to send the packet out on a designated port. The password packets follow different routes to the server because the routing tables route packets addressed to the different IP addresses through different ports of each router. Thus, packet routing is changed by changing the destination address. Once again, if a hacker is monitoring a router such as Router-D because it is on the shortest path to the server, the hacker will not learn all of the characters of the password.

It should also be understood that the forced packet routing of the present invention may be performed through nodes other than routers. For example, if a large corporation or financial institution has many offices and many servers distributed around the country, the routing tables may be implemented in the company's servers and the password packets may be routed through intermediate company servers before arriving at the authentication server. The intermediate servers may perform the functions described above for routers. In this manner, forced packet routing may be achieved even though the company has no control over routers, for example, in the Internet.

As an example, a user in Dallas may desire to log onto his bank's website, the server for which is located in Chicago. The access device divides the password into multiple segments and sends each segment to the authentication server in a different packet. Each packet is sent via a different one of the bank's servers. For example, a first packet may be sent to an intermediate server in Denver, while a second packet is sent to an intermediate server in Atlanta. A third packet may be sent to an intermediate server in St. Louis. Each of the intermediate servers may forward its received packet to another intermediate server or may send the packet directly to the authentication server in Chicago. Once again, a hacker attempting to capture the password from a router located between Dallas and Chicago will not be able to capture all of the password characters.

It should also be noted that when the inventive time delays of the present invention are used as a second or third password factor in embodiments in which the packets are forced to follow different paths, it is not possible for the hacker to determine the inter-packet timing, even if the hacker distributes his monitoring efforts and intercepts all of the password packets.

Figure 14:
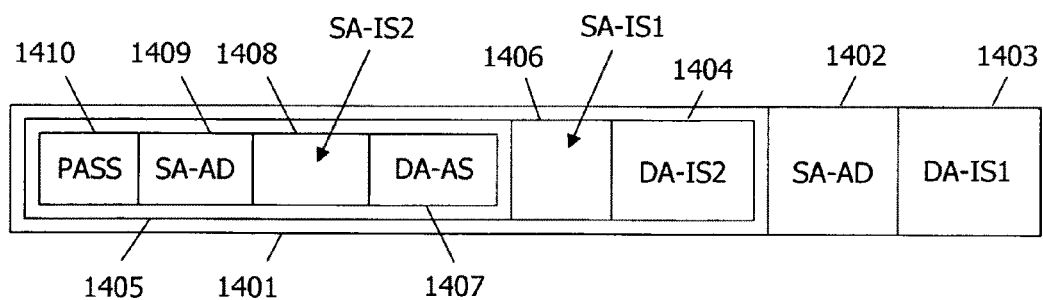
FIG. 14 illustrates a packet encapsulation method of implementing forced packet routing.

FIG. 14 illustrates a packet encapsulation method of implementing forced packet routing. In this embodiment, the access device again divides the password into multiple segments and sends each segment to the authentication server in a different packet. The packets are sent through intermediate servers or routers. In the example shown, a packet is sent through two intermediate servers, IS1 and IS2. The access device sends the password packet and a header for the second intermediate server within an outer encapsulation frame 1401. The outer encapsulation frame includes its own header comprising the source address for the access device (SA-AD) 1402 and the destination address for the first intermediate server (SA-IS1) 1403.

When the first intermediate server receives the outer encapsulation frame, the server strips off the header, revealing the destination address for the second intermediate server (DA-IS2) 1404 in a header for an inner encapsulation frame 1405. The first intermediate server adds its own source address (SA-IS1) 1406 to the header for the inner encapsulation frame and sends the frame to the second intermediate server. When the second intermediate server receives the inner encapsulation frame, the server strips off the header, revealing the destination address for the authentication server (DA-AS) 1407 in a header for the password packet. The second intermediate server adds its own source address (SA-IS2) 1408 to the header for the password packet and sends the packet to the authentication server. When the authentication server receives the packet, the server strips off the header, revealing the source address (or other identifier) of the access device 1409 and the password characters (PASS) 1410.

By encapsulating each of the password packets with the addresses of different intermediate servers or routers, the access device can control the path which each packet follows to the authentication server. Once again, if the packets follow different paths, a hacker monitoring a single router or path will not obtain all of the password characters. Also, when the inventive time delays of the present invention are used as a second or third password factor, it is not possible for the hacker to determine the inter-packet timing.

Figure 15:
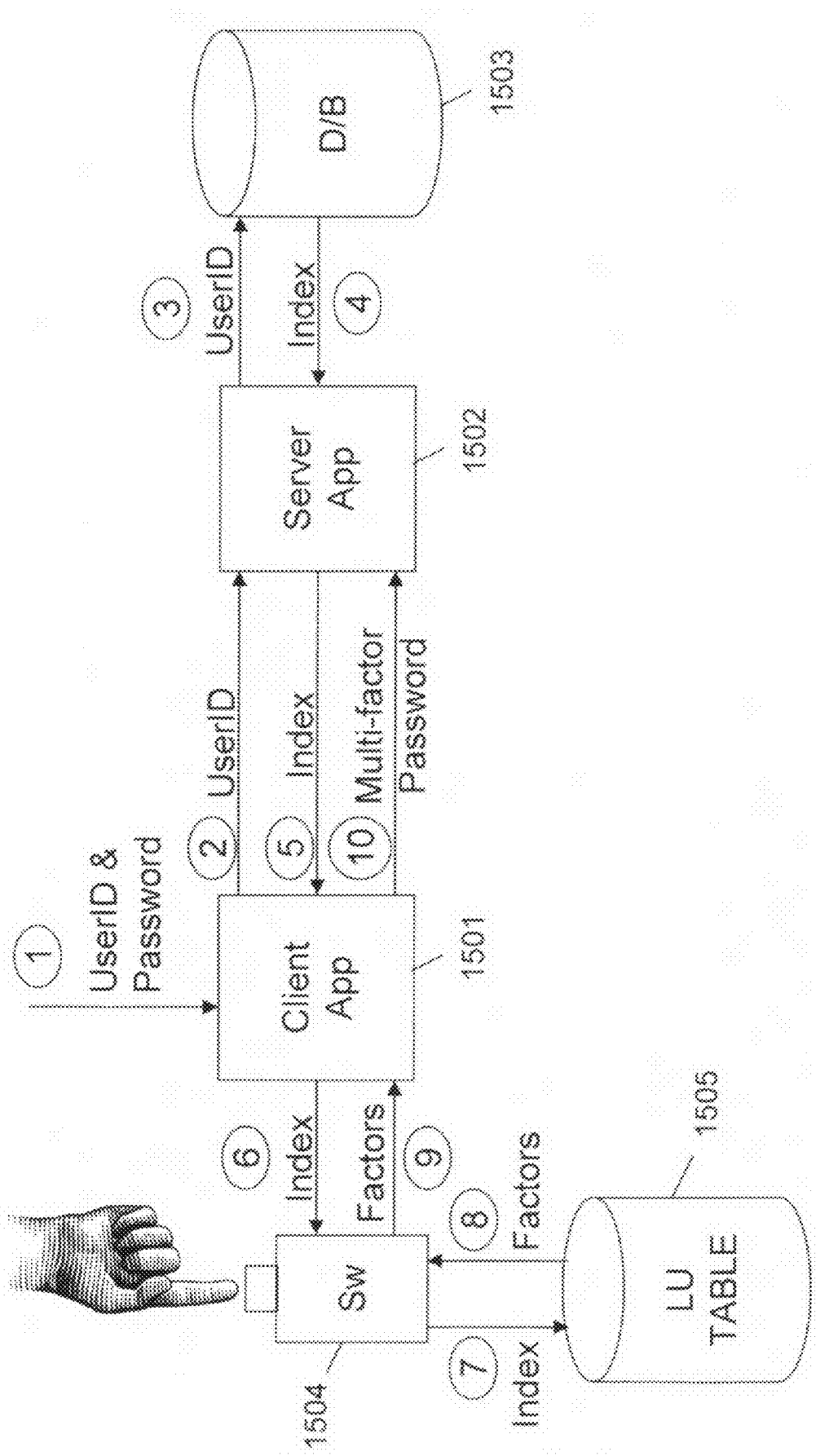
FIG. 15 is a functional block diagram illustrating the flow of information between system components when performing an exemplary secure logon method with a single password-protected server.

FIG. 15 is a functional block diagram illustrating the flow of information between system components when performing an exemplary secure logon method with a single password-protected server. In this embodiment, the system includes a client application 1501, a server application 1502, a server database 1503, a hardware switch 1504, and a lookup table 1505. The client application may be installed if, for example, on a user's PC. The server application may be located at the password protected server together with the server database. The mechanical switch physically isolates the lookup table from the user's PC, thereby protecting the lookup table from Trojan programs inadvertently downloaded from the Internet. The hardware switch and lookup table may be implemented in various alternative locations such as in the user's PC, the user's keyboard, or in a USB plug-in device.

The process begins at step 1 where a user enters into the client application 1501, a User ID and associated password. At step 2, the client application sends the User ID to the server application 1502. The server application recognizes the User ID and uses it at step 3 to access the server database 1503. At step 4, the server database sends an index value to the server application. At step 5, the server application sends the index value to the client application. When the user presses the hardware switch 1504, the switch allows a single access to the lookup table 1505. The client application sends the index value at step 6 to the switch, which uses the index value at step 7 to access the lookup table. At step 8, the lookup table sends one or more password modification factors to the switch, which returns the factors at step 9 to the client application. The password modification factors may include, for example, instructions regarding how to segment the user's password into separate data packets, time intervals for use between each of the data packets, multiple IP addresses for sending each data packet to a different address, extra "filler" bits for placement in the data packets to disguise the character or characters of the password, and the like. The client application then uses the password modification factors to modify the password entered by the user to create a multi-factor password. At step 10, the client application sends the multi-factor password to the server application for authentication.

The process illustrated in FIG. 15 defeats all known Internet threats. The hardware switch 1504 defeats Trojan programs by physically isolating the lookup table 1505 from the user's PC. The fact that the system creates a multi-factor password, which is different from the password entered by the user, defeats key-logging programs. If the server application 1502 returns a different index value each time the user logs on, the client application 1501 creates a different multi-factor password each time. This defeats hackers who might intercept the password and attempt to use it later because the password is good for one time only. The system defeats phishing sites because a phishing site cannot know or return a proper index value for creating a legitimate multi-factor password.

Figure 16:
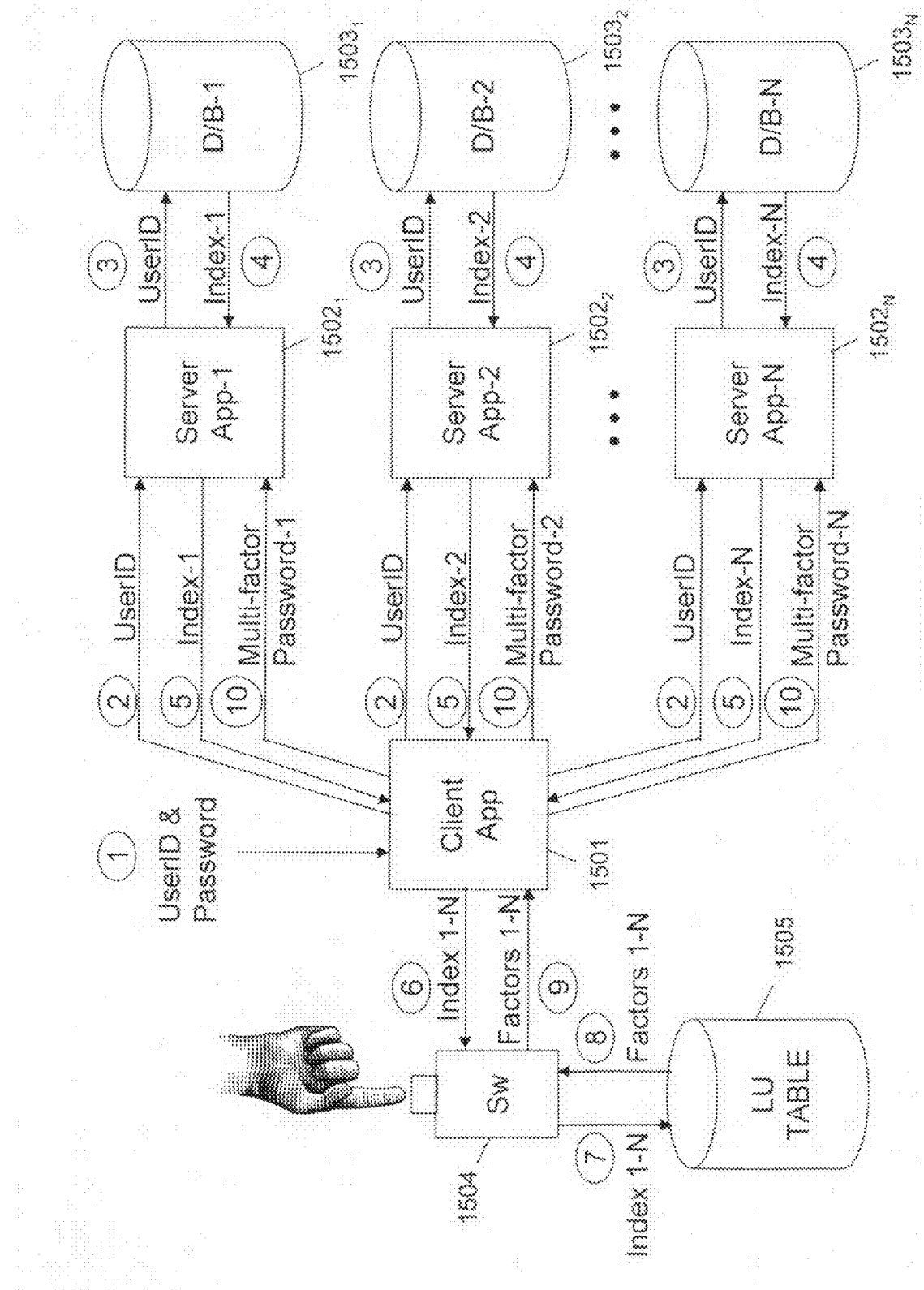
FIG. 16 is a functional block diagram illustrating the flow of information between system components when performing an exemplary secure logon method with multiple password-protected servers.

FIG. 16 is a functional block diagram illustrating the flow of information between system components when performing an exemplary secure logon method with multiple password-protected servers. The process is essentially the same as that described in connection with FIG. 15, except that the client application 1501 independently performs the process with each of the password-protected servers. Thus, when the user enters the User ID and associated password into the client application 1501, the client application sends the User ID to each of the server applications $1502_1$-$1502_N$. Each server application recognizes the User ID and uses it at step 3 to access an associated server database $1503_1$-$1503_N$ to extract a unique index value for each server. Each server application then sends its own unique index value to the client application.

The client application 1501 utilizes each of the unique index values to extract different sets of password modification factors from the lookup table 1505. In an alternative embodiment, the client may access separate lookup tables associated with the password-protected servers. The client application then uses the password modification factors to modify the password entered by the user to create multiple multi-factor passwords, one for each server. At step 10, the client application sends the multi-factor passwords to the server applications $1502_1$-$1502_N$ for authentication.

It is important to note that while the present invention has been described in the context of a fully functional computer system and network, those skilled in the art will appreciate that the instructions for practicing the method of the present invention are capable of being recorded on any type of a computer readable medium. The steps of the method of the present invention are executed, regardless of the particular type of signal-bearing media actually utilized. Examples of computer readable media include: nonvolatile, hard-coded type media such as read only memories (ROMs) or erasable, electrically programmable read only memories (EEPROMs), recordable type media such as floppy disks, hard disk drives, solid state drives, flash memory and CD-ROMs, and transmission type media such as digital and analog communication links.

It is thus believed that the operation and construction of the present invention will be apparent from the foregoing description. While the system and apparatus shown and described has been characterized as being preferred, it will be readily apparent that various changes and modifications could be made therein without departing from the scope of the invention as defined in the following claims.

What is claimed is:

1. A computer-implemented method of securely sending a password from an authorized access device to an authentication device, said method comprising the steps of:
   sending an identifier from the access device to the authentication device;
   receiving from the authentication device, a response containing information regarding modifications to be made to a password associated with the identifier, wherein the response contains an index value pointing to a particular memory location in a database in the access device, said database storing a plurality of password modifications;
   modifying the password based at least in part on the information received from the authentication device, wherein the modifying step includes:
      utilizing the index value to retrieve at least one password modification from the database, wherein the at least one password modification includes a plurality of time intervals; and
      modifying the password with the at least one password modification retrieved from the database, wherein the password is divided into a plurality of password segments and each segment is placed in a different one of a plurality of data packets; and
   transmitting the modified password from the access device to the authentication device, the step of transmitting the modified password including individually transmitting each of the plurality of data packets separated in time from a previous packet by one of the plurality of time intervals.

2. The method as recited in claim 1, wherein the identifier is a User ID received in the access device from a user.

3. The method as recited in claim 1, wherein the at least one password modification also includes a plurality of addresses, and wherein:
   the step of transmitting the modified password also includes individually transmitting each of the plurality of data packets to a different one of the plurality of addresses.

4. A computerized access device for securely sending a multi-character password to an authentication device, said access device comprising:
   means for receiving a User ID and an associated password from a user;
   means for sending from the access device to the authentication device, only the User ID;
   means for receiving from the authentication device, an index value associated with the User ID;
   a database for storing a plurality of password modification time intervals;
   means for extracting from the database, at least one password modification time interval stored at a database location corresponding to the index value;
   means for modifying the password received from the user by dividing the password into a plurality of password segments and placing each segment in a different one of a plurality of data packets; and
   means for transmitting the modified password from the access device to the authentication device, wherein each of the plurality of data packets is individually transmitted separated in time from a previous packet by one of the plurality of time intervals.

5. A computer-implemented method enabling a user to securely access a plurality of password-protected servers with a single entry of the user's User ID and associated password, said method comprising the steps of:
   receiving in an access device, the User ID and the associated password from the user;
   sending only the User ID from the access device to each of the password-protected servers;
   receiving from each of the password-protected servers, a response containing information regarding modifications to be made to the password, wherein the information received from each of the password-protected servers includes information for determining a plurality of time intervals which are different for each server;
   creating a plurality of modified passwords based at least in part on the information received from each of the password-protected servers, wherein each modified password corresponds to one of the password-protected servers, wherein each modified password is divided into a plurality of password segments and each segment is placed in a different one of a plurality of data packets; and
   transmitting each of the plurality of modified passwords from the access device to the corresponding password-protected server, wherein the transmitting step includes, for each modified password, individually transmitting each of the plurality of data packets to the corresponding password-protected server, wherein each data packet is separated in time from a previous packet by one of the plurality of time intervals.

6. The method as recited in claim 5, wherein the step of receiving a response from each of the password-protected servers includes receiving a response from each server containing an index value pointing to a particular memory location in a database in the access device, said database storing a plurality of password modifications.

7. The method as recited in claim 5, wherein the information received from each of the password-protected servers also includes instructions for dividing the password into the plurality of password segments.

8. The method as recited in claim 5, wherein:
   the information received from each of the password-protected servers includes a plurality of addresses associated with the corresponding password-protected server; and
   the step of transmitting each of the plurality of modified passwords also includes, for each modified password, individually transmitting each of the plurality of data packets to a different one of the plurality of addresses associated with the corresponding password-protected server.

9. A computerized access device for enabling a user to securely access a plurality of password-protected servers with a single entry of the user's User ID and associated password, said access device comprising:
   means for receiving the User ID and the associated password from the user;
   means for sending only the User ID from the access device to each of the password-protected servers;
   means for receiving from each of the password-protected servers, a response containing information regarding modifications to be made to the password, wherein the information received from each of the password-protected servers includes information for determining a plurality of time intervals which are different for each server;

means for creating a plurality of modified passwords based at least in part on the information received from each of the password-protected servers, wherein each modified password corresponds to one of the password-protected servers, wherein each modified password is divided into a plurality of password segments and each segment is placed in a different one of a plurality of data packets; and means for transmitting each of the plurality of modified passwords from the access device to the corresponding password-protected server, wherein for each modified password, each of the plurality of data packets is individually transmitted to the corresponding password-protected server, wherein each data packet is separated in time from a previous packet by one of the plurality of time intervals.

10. A system for enabling a user to securely access a plurality of password-protected servers with a single entry of the user's User ID and associated password, said system comprising:

an access device comprising:
means for receiving the User ID and the associated password from the user;
means for sending only the User ID from the access device to each of the password-protected servers;
means for receiving from each of the password-protected servers, a response containing information regarding modifications to be made to the password, wherein the information received from each of the password-protected servers includes information for determining a plurality of time intervals which are different for each server;
means for creating a plurality of modified passwords based at least in part on the information received from each of the password-protected servers, wherein each modified password corresponds to one of the password-protected servers, wherein each modified password is divided into a plurality of password segments and each segment is placed in a different one of a plurality of data packets; and
means for transmitting each of the plurality of modified passwords from the access device to the corresponding password-protected server, wherein for each modified password, each of the plurality of data packets is individually transmitted to the corresponding password-protected server, wherein each data packet is separated in time from a previous packet by one of the plurality of time intervals; and a plurality of server applications associated with the plurality of password-protected servers, wherein each given server application comprises:
means for recognizing the User ID and determining the information regarding modifications to be made to the password, wherein the information is unique to each server application and each User ID;
means for sending the information to the access device; and
means for authenticating a modified password received from the access device, wherein the password is modified with the information sent to the access device by the given server application, wherein the password is positively authenticated only if the received password segments match stored password segments for the User ID, and the time intervals between the data packets match time intervals corresponding to the information sent to the access device.

11. A computer program loaded on a non-transitory internal memory of an access device, wherein the program includes a plurality of code portions which, when run on a processor of the access device, cause the access device to securely access a plurality of password-protected servers with a single entry of a user's User ID and associated password by performing the following steps:

receiving in the access device, the User ID and the associated password from the user;
sending only the User ID from the access device to each of the password-protected servers;
receiving from each of the password-protected servers, a response containing information regarding modifications to be made to the password, wherein the information includes an index value pointing to a particular memory location in a database in the access device, said database storing a plurality of password modifications;
creating a plurality of modified passwords based at least in part on the information received from each of the password-protected servers, wherein each modified password corresponds to one of the password-protected servers, wherein the creating step includes, for each modified password:
utilizing the index value to retrieve at least one password modification from the database, wherein the at least one password modification includes a plurality of time intervals; and
modifying the password with the at least one password modification retrieved from the database, wherein the modifying step includes dividing the password into a plurality of password segments and placing each segment in a different one of a plurality of data packets; and
transmitting each of the plurality of modified passwords from the access device to the corresponding password-protected server, wherein the transmitting step includes individually transmitting each of the plurality of data packets separated in time from a previous packet by one of the plurality of time intervals.

12. The computer program as recited in claim 11, wherein the at least one password modification also includes a plurality of addresses, and wherein:
the step of transmitting the modified password also includes individually transmitting each of the plurality of data packets to a different one of the plurality of addresses.

* * * * *